(12) United States Patent
Morita

(10) Patent No.: US 9,783,069 B2
(45) Date of Patent: Oct. 10, 2017

(54) BATTERY VOLTAGE CONTROL DEVICE AND BATTERY VOLTAGE CONTROL METHOD

(71) Applicant: FUJI JUKOGYO KABUSHIKI KAISHA, Tokyo (JP)

(72) Inventor: Tomohiro Morita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 224 days.

(21) Appl. No.: 14/625,460

(22) Filed: Feb. 18, 2015

(65) Prior Publication Data

US 2015/0231977 A1 Aug. 20, 2015

(30) Foreign Application Priority Data

| Feb. 18, 2014 | (JP) | ................................ | 2014-028408 |
| Mar. 19, 2014 | (JP) | ................................ | 2014-056490 |
| May 28, 2014 | (JP) | ................................ | 2014-109888 |

(51) Int. Cl.
*H02J 7/00* (2006.01)
*H02J 7/14* (2006.01)
(Continued)

(52) U.S. Cl.
CPC ......... *B60L 11/1809* (2013.01); *B60L 11/126* (2013.01); *B60L 11/14* (2013.01);
(Continued)

(58) Field of Classification Search
USPC ....... 320/109, 104, 107, 134, 137, 108, 132, 320/166, 103, 114, 125, 135, 140, 149,
(Continued)

(56) References Cited

U.S. PATENT DOCUMENTS

| 8,004,109 B2 * | 8/2011 | Komatsu | ............. H02M 5/4585 |
| | | | 307/115 |
| 8,442,727 B2 * | 5/2013 | Yamamoto | ............. B60K 6/442 |
| | | | 320/109 |

(Continued)

FOREIGN PATENT DOCUMENTS

| JP | H08-308025 | A | 11/1996 |
| JP | H11-198677 | A | 7/1999 |
| JP | 2000-343980 | A | 12/2000 |
| JP | 2007-089262 | A | 4/2007 |
| JP | 2007089262 | A * | 4/2007 |
| JP | 2009-292383 | A | 12/2009 |

(Continued)

OTHER PUBLICATIONS

Office Action Received for Japanese Patent Application No. 2014-109888, Mailed on Apr. 5, 2016, 10 Pages of Office Action Including 7 Pages of English Translation.

*Primary Examiner* — Alexis Pacheco

(74) *Attorney, Agent, or Firm* — Chip Law Group

(57) ABSTRACT

A battery voltage control device includes a step-up module that steps up a voltage of a battery and applies the voltage to a driving motor, an image analysis processing module that acquires and analyzes a piece of image information of an outside of a vehicle that is obtained through imaging, and driving state forecast module that forecasts a driving state including starting or stopping of the vehicle based on a piece of environment information of the outside of the vehicle that is obtained through analysis of the piece of image information and controls step-up by the step-up module based on the forecast driving state.

22 Claims, 24 Drawing Sheets

(51) Int. Cl.
*B60L 11/18* (2006.01)
*B60L 11/12* (2006.01)
*B60L 11/14* (2006.01)
*B60L 15/20* (2006.01)

(52) U.S. Cl.
CPC ......... *B60L 15/209* (2013.01); *B60L 2210/12* (2013.01); *B60L 2210/14* (2013.01); *B60L 2210/30* (2013.01); *B60L 2210/42* (2013.01); *B60L 2240/12* (2013.01); *B60L 2240/14* (2013.01); *B60L 2240/527* (2013.01); *B60L 2240/547* (2013.01); *B60L 2240/66* (2013.01); *B60L 2240/68* (2013.01); *B60L 2250/28* (2013.01); *B60L 2260/26* (2013.01); *B60L 2260/50* (2013.01); *B60L 2260/58* (2013.01); *Y02T 10/6217* (2013.01); *Y02T 10/645* (2013.01); *Y02T 10/7005* (2013.01); *Y02T 10/7077* (2013.01); *Y02T 10/7225* (2013.01); *Y02T 10/7233* (2013.01); *Y02T 10/7241* (2013.01); *Y02T 10/7275* (2013.01); *Y02T 10/7291* (2013.01); *Y02T 90/16* (2013.01); *Y02T 90/34* (2013.01)

(58) Field of Classification Search
USPC ........................................ 320/152, 157, 162
See application file for complete search history.

(56) References Cited

U.S. PATENT DOCUMENTS

| | | | |
|---|---|---|---|
| 2011/0006731 A1* | 1/2011 | Wang | B60L 11/1816 320/109 |
| 2011/0101778 A1* | 5/2011 | Yang | H02J 7/0068 307/52 |
| 2012/0306443 A1* | 12/2012 | Smith | H02J 7/00 320/109 |
| 2013/0076902 A1* | 3/2013 | Gao | B25J 9/042 348/148 |
| 2013/0124064 A1 | 5/2013 | Nemoto | |
| 2013/0307471 A1* | 11/2013 | Ichikawa | H02J 7/007 320/108 |
| 2014/0028256 A1* | 1/2014 | Sugiyama | B60L 1/006 320/109 |
| 2014/0203759 A1* | 7/2014 | Sugiyama | B60L 1/003 320/104 |
| 2014/0306668 A1* | 10/2014 | Lee | B60L 11/1838 320/152 |
| 2016/0185241 A1* | 6/2016 | Kinomura | B60L 3/0023 307/10.1 |

FOREIGN PATENT DOCUMENTS

| | | |
|---|---|---|
| JP | 4802849 B2 | 8/2011 |
| JP | 2012-025352 A | 2/2012 |

* cited by examiner

FIG. 3

| BATTERY VOLTAGE | STEP-UP VOLTAGE [V] | STEP-UP RATIO | PRIMARY POWER [kW] | | | | | | | | | | | | | |
|---|---|---|---|---|---|---|---|---|---|---|---|---|---|---|---|---|
| | | | -70 | -60 | -50 | -40 | -30 | -20 | -10 | 0 | 10 | 20 | 30 | 40 | 50 | 60 | 70 |
| 200 | 200 | 1.000 | 96% | 96% | 97% | 97% | 98% | 98% | 98% | - | 98% | 98% | 97% | 97% | 96% | 96% | 95% |
| | 300 | 1.500 | 95% | 96% | 96% | 96% | 97% | 97% | 97% | - | 97% | 97% | 96% | 96% | 96% | 95% | 95% |
| | 400 | 2.000 | 95% | 95% | 96% | 96% | 96% | 97% | 97% | - | 97% | 97% | 96% | 96% | 96% | 95% | 95% |
| | 500 | 2.500 | 95% | 95% | 95% | 96% | 96% | 96% | 96% | - | 96% | 96% | 96% | 96% | 95% | 95% | 94% |
| | 600 | 3.000 | 94% | 94% | 95% | 95% | 95% | 95% | 95% | - | 95% | 95% | 95% | 95% | 95% | 94% | 94% |
| | 650 | 3.250 | 94% | 94% | 95% | 95% | 95% | 95% | 95% | - | 95% | 95% | 95% | 95% | 95% | 94% | 94% |

SPORT # MODE
(FULL THROTTLE ACCELERATION,
NO LIMIT ON CHANGE RATE)

SPORT MODE
(FULL THROTTLE ACCELERATION,
NO LIMIT ON CHANGE RATE)

NO LANE CHANGE STEP-UP CONTROL

BATTERY VOLTAGE CONTROL DEVICE AND BATTERY VOLTAGE CONTROL METHOD

CROSS-REFERENCE TO RELATED APPLICATIONS

The present application claims priority from Japanese Patent Application No. 2014-028408 filed on Feb. 18, 2014, Japanese Patent Application No. 2014-056490 filed on Mar. 19, 2014, and Japanese Patent Application No. 2014-109888 filed on May 28, 2014, the entire contents of which are hereby incorporated by reference.

BACKGROUND

1. Technical Field

The present disclosure relates to a battery voltage control device and a battery voltage control method.

2. Related Art

Japanese Unexamined Patent Application Publication (JP-A) No. 8-308025 describes that, when an inverter DC current is lower than or equal to a prescribed discharge current during acceleration of a vehicle, a converter is controlled to turn off, and when the inverter DC current exceeds the defined discharge current, the converter is controlled to step up a voltage so that a second electric condenser supplies the exceeding amount of the current. Further, JP-A No. 8-308025 discloses that, when the inverter DC current is lower than or equal to the prescribed discharge current during deceleration, the converter is controlled to turn off, and when it exceeds the prescribed discharge current, the converter is controlled to step down the voltage so that the exceeding amount of the current flows to the second electric condenser.

In addition, vehicles that use electric motors such as electric automobiles, hybrid automobiles, and fuel cell automobiles have recently garnered attention as eco-friendly automobiles. In such a vehicle, it is assumed that a DC current from a power supply is stepped up by a step-up converter and the stepped up voltage is converted into an AC voltage to drive a motor. For example, Japanese Patent No. 4802849 describes that a step-up voltage is changed according to a state of an eco-switch being on or off.

Moreover, Japanese Unexamined Patent Application Publication (JP-A) No. 2009-292383 describes execution of step-up control of a hybrid automobile and the like in which a voltage to be supplied to an electric motor is stepped up in advance in preparation for a request for a driving force increase. In addition, JP-A No. 2009-292383 describes that it is determined whether or not a subject vehicle will pass a preceding vehicle based on information from a blinker sensor.

In step-up control by a step-up converter, however, after step-up is started, a delay occurs until a voltage reaches a target step-up voltage. In the technology described in JP-A No. 8-308025, the converter is controlled to step up the voltage when the inverter DC current exceeds the prescribed discharge current, and thus there are problems that it is not possible to instantly obtain a maximum output due to such a response delay of the converter, a feeling of lagging acceleration occurs, and start acceleration performance deteriorates.

Furthermore, when the step-up converter performs step-up control, a loss of the step-up converter increases as a step-up voltage becomes higher. In the technology described in JP-A No. 8-308025, when a vehicle stops from a travel state, the converter is set to turn off when the inverter DC current is lower than or equal to the prescribed discharge current, and thus there are problems that it is not possible to immediately stop the converter, and reduction of a loss of the step-up converter becomes late. In addition, if a step-up voltage is decided by adding a margin to a target voltage in order to cope with the aforementioned response delay, there is a problem that a loss of the step-up converter further increases.

Moreover, in the technology described in Japanese Patent No. 4802849, the states of the eco-switch being on and off are considered during step-up, but control according to a travel mode that relates to an output characteristic of a driving motor (for example, a sport mode, an intelligent mode, or the like) is not considered at all. For this reason, problems that it is not possible to optimally control a step-up voltage according to a travel mode, an increase in a loss caused by excessive step-up, deterioration in acceleration performance caused by insufficient step-up, and the like are assumed to occur.

Furthermore, when the step-up converter performs step-up control, a loss of the step-up converter increases as a step-up voltage becomes higher. In the technology described in JP-A No. 2009-292383, the supply voltage to the electric motor is stepped up in advance in preparation for the request for a driving force increase, but if step-up of the supply voltage increases more than necessary, an increase of a loss is problematic. Thus, in the technology described in JP-A No. 2009-292383, it is not possible to precisely perform step-up control and it is difficult to optimally control step-up of a voltage with a loss suppressed to its minimum.

SUMMARY OF THE INVENTION

The present disclosure was achieved in view of the above problems, and an object of the present disclosure is to provide a novel and improved battery voltage control device and battery voltage control method that can improve drivability and suppress a loss to the minimum by controlling step-up of a battery based on a travel mode or a driving state of a vehicle.

In order to solve the above problems, according to an aspect of the present invention, there is provided a battery voltage control device including a step-up module that steps up a voltage of a battery and then applies the voltage to a driving motor, and a step-up control module that controls step-up by the step-up module based on a travel mode or a driving state of a vehicle.

Further, an outside-of-vehicle monitoring module that monitors the outside of a vehicle to acquire a piece of environment information of the outside of the vehicle, and a driving state forecast module that forecasts a driving state including starting or stopping of the vehicle based on the environment information of the outside of the vehicle may be included, and the step-up control module may control step-up by the step-up module based on the forecast driving state.

Further, the outside-of-vehicle monitoring module may have an image analysis processing module that acquires and analyzes a piece of image information of the outside of the vehicle obtained through imaging, and acquire the piece of environment information based on the piece of image information.

Further, the image analysis processing module may acquire the image information from a stereo camera assembly.

Further, the driving state forecast module may forecast starting or stopping of the vehicle based on the piece of environment information that indicates a lighting state of a traffic signal ahead of the vehicle.

Further, the driving state forecast module may forecast starting or stopping of the vehicle based on the piece of environment information that indicates a lighting state of a brake lamp of a preceding vehicle ahead of the vehicle.

Further, a travel mode acquisition module that acquires a travel mode that relates to an output characteristic of the driving motor, and an accelerator opening degree acquisition module that acquires an accelerator opening degree may be included, and the step-up control module may control a target step-up voltage of step-up by the step-up module based on the travel mode and the accelerator opening degree.

Further, the step-up control module may set the target step-up voltage to be higher than a necessary step-up voltage necessary for the driving motor to output a target driving force, and change a margin of the target step-up voltage with respect to the necessary step-up voltage according to the travel mode.

Further, the step-up control module may include a future driver-required driving force computation module that computes a future driver-required driving force based on the travel mode and the accelerator opening degree, and a target step-up voltage computation module that computes the target step-up voltage based on the future driver-required driving force.

Further, the future driver-required driving force computation module may compute a driver-required driving force based on a map on which a relation between an accelerator opening degree and a required driving force is defined for each of the driving modes, and compute the future driver-required driving force based on the driver-required driving force.

Further, the future driver-required driving force computation module may perform a limit process that is based on a threshold of a change rate of the driver-required driving force on the driver-required driving force, and compute the future driver-required driving force based on the driver-required driving force that has undergone the limit process.

Further, an environment information acquisition module that acquires a piece of environment information of the outside of the vehicle, and a driving state forecast module that forecasts whether or not acceleration for passing will be performed by a lane change based on the piece of environment information may be included, and the step-up control module may control step-up by the step-up module based on a voltage margin according to a vehicle speed or a driver-required driving force when the acceleration for passing is forecast to be performed.

Further, the step-up control module may set a value of the voltage margin to be higher as the vehicle speed becomes lower.

Further, the step-up control module may set a value of the voltage margin to be higher as the required driving force becomes smaller.

Further, the step-up control module may set the voltage margin based on a voltage margin map on which the voltage margin is prescribed according to the vehicle speed or the required driving force.

Further, the voltage margin map may prescribe the voltage margin based on the vehicle speed or the required driving force according to a driving mode.

In order to solve the above problems, according to another aspect of the present invention, there is provided a battery voltage control method including acquiring a driving state of a vehicle, and controlling step-up of a battery voltage by a step-up converter based on a travel mode or the driving state of the vehicle.

Further, monitoring the outside of the vehicle and acquiring a piece of environment information of the outside of the vehicle, and forecasting a driving state including starting or stopping of the vehicle based on the piece of environment information of the outside of the vehicle may be included, and, in the controlling of the step-up, the step-up of the battery voltage by the step-up converter may be controlled based on the forecast driving state.

Further, acquiring a travel mode that relates to an output characteristic of a driving motor, and acquiring an accelerator opening degree, may be included, and, in the controlling of the step-up, a target step-up voltage of step-up of a battery voltage to be applied to the driving motor may be controlled based on the travel mode and the accelerator opening degree.

Further, acquiring a piece of environment information of the outside of the vehicle, forecasting whether or not acceleration for passing will be performed by a lane change based on the piece of environment information of the outside of the vehicle, and computing a voltage margin according to a vehicle speed of a driver-required driving force when the acceleration for passing is forecast may be included, and, in the step of controlling the step-up, step-up of a battery voltage by a step-up converter may be controlled based on the computed voltage margin.

BRIEF DESCRIPTION OF THE DRAWINGS

FIG. 3 is a schematic diagram illustrating conversion efficiencies of the step-up converter;

DETAILED DESCRIPTION

Figure 1:
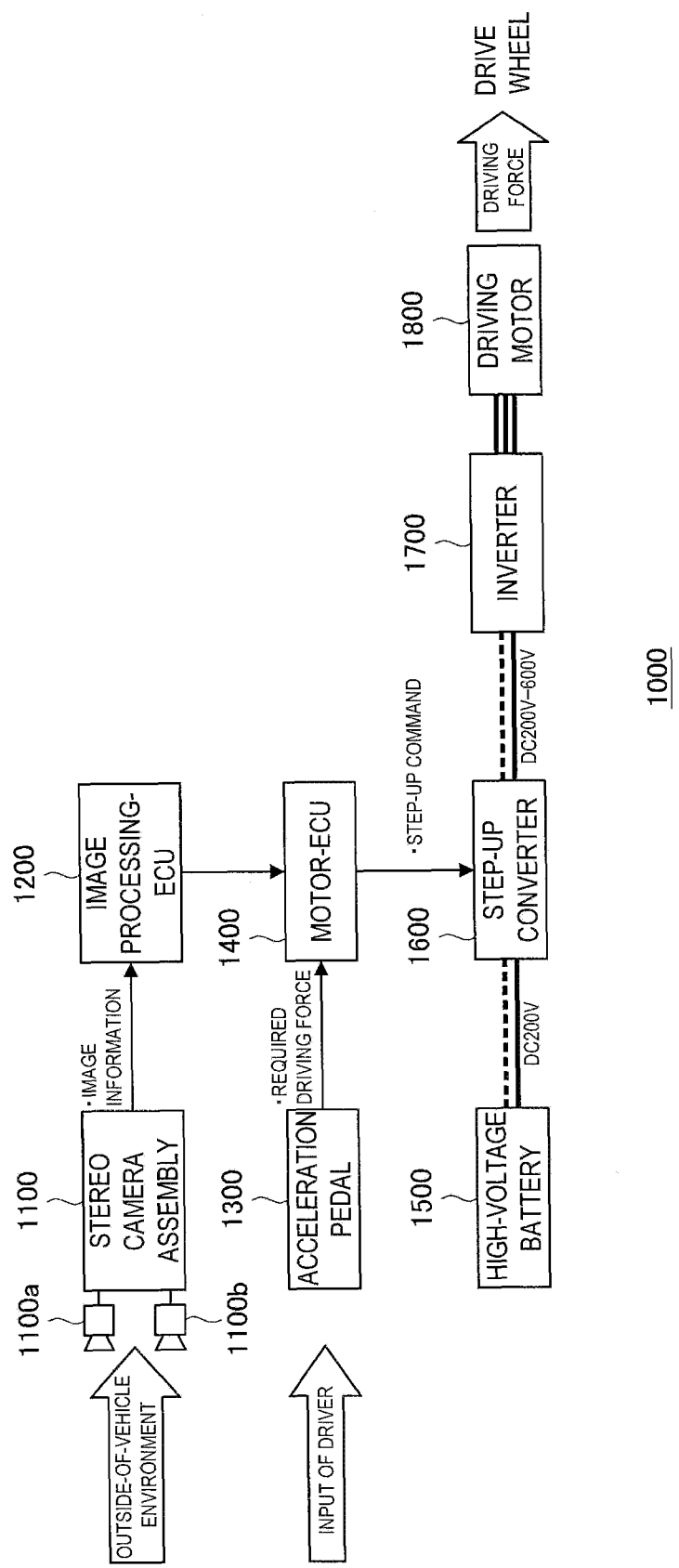
FIG. 1 is a schematic diagram illustrating a system according to an implementation of the present disclosure.

Hereinafter, preferred examples of the present disclosure will be described in detail with reference to the appended drawings. Note that, in this specification and the appended drawings, structural elements that have substantially the same function and structure are denoted with the same reference numerals, and repeated explanation of these structural elements is omitted.

1. First Implementation

First, a configuration of a system 1000 according to a first implementation of the present disclosure will be described with reference to FIG. 1. FIG. 1 is a schematic diagram illustrating the system 1000 for driving a vehicle such as an electric automobile according to the first implementation of the present disclosure. Note that, although an electric automobile is exemplified herein, the system 1000 according to the present implementation can also be widely applied to other types of vehicles such as a hybrid automobile. As illustrated in FIG. 1, the system 1000 has a stereo camera assembly 1100, a controller 1200 for the stereo camera assembly (image processing-ECU), an acceleration pedal 1300, a controller 1400 for a motor (a motor-ECU), a high-voltage battery 1500, a step-up converter 1600, an inverter 1700, and a driving motor 1800. Note that, in FIG. 1, the controller 1200 for the stereo camera assembly and the controller 1400 for the motor are exemplified as separate units; however, both controllers may be formed as an integrated controller. Note that the step-up converter 1600 serves as the step-up module of the appended claims in the present implementation, and the controller 1400 for the motor serves as the step-up control module of the appended claims in the present implementation.

A system that drives a vehicle such as a hybrid automobile or an electric automobile has a driving motor for driving drive wheels. In the configuration illustrated in FIG. 1, the driving motor 1800 can generate a higher output as a voltage of the inverter 1700 that converts a voltage from DC into AC becomes higher. For this reason, a voltage of the high-voltage battery 1500 is stepped up by the step-up converter 1600 and then applied to the inverter 1700. On the other hand, when a voltage of the high-voltage battery 1500 is stepped up, a loss occurs in the step-up converter 1600 according to the increase in the stepped up voltage. The loss increases as a step-up ratio of the step-up converter 1600 becomes higher, and thus, a high output leads to an increase of a loss of the step-up converter 1600. Further, in order to step up a voltage of the high-voltage battery 1500 to the maximum voltage of the inverter 1700, a period of a delay of about 200 ms is taken until actual step-up for a target voltage is performed. For this reason, even if step-up is performed when a vehicle is started, actual step-up is delayed until after it is started, and thus a feeling of lagging acceleration or deterioration in drivability occurs. Thus, there are demands to improve drivability and suppress a loss to a minimum level by anticipating a driving state including starting or stopping of a vehicle and controlling step-up of a battery.

In the system 1000 of the present implementation, when a vehicle is started, an image processing system that includes the stereo camera assembly 1100 detects an indication that the subject vehicle will start from its stopped state. As the starting indication, a change of the color of a traffic light ahead of the vehicle from red to green, a change of the brake lamps of a preceding vehicle from on to off, a preceding vehicle starting from its stopped state, or the like is exemplified. When the image processing system recognizes such a situation, the system 1000 detects a starting indication. Then, when the starting indication is recognized, the step-up converter 1600 is driven to step up a voltage to be supplied to the inverter 1700 before the driver depresses the acceleration pedal, and a maximum output can be instantly produced in response to the acceleration pedal of the driver.

In addition, when a vehicle lowers its speed and stops, the image processing system detects an omen that the vehicle will stop from its traveling state. As the stopping indication, a change of the color of a traffic light ahead of the vehicle from green to red, a decrease in an inter-vehicle distance with a preceding vehicle, or the like is exemplified. When the image processing system recognizes such a situation, the system 1000 detects a stopping indication. Then, once the stopping indication is recognized, the driver will no longer require high output, and thus, by stopping the step-up converter 1600, a loss of the step-up converter 1600 is suppressed.

In the configuration illustrated in FIG. 1, the stereo camera assembly 1100 has a pair of right and left cameras 1100a and 1100b each having an image sensor such as a CCD sensor or a CMOS sensor, captures an external environment of the outside of the vehicle, and transmits the captured image information to the controller 1200. The stereo camera assembly 1100 according to the present implementation is constituted by color cameras that can acquire color information. Because the stereo camera assembly 1100 can acquire color information, it can recognize, for example, whether the brake lamps of a vehicle traveling ahead of the vehicle are on or off, a color of a traffic light, a road sign, and the like as image information. The stereo camera assembly 1100 outputs the recognized image information to the controller 1200.

The controller 1200 generates and acquires information on a distance to an object from a deviation amount of a corresponding position using the principle of triangulation with regard to a set of right and left stereo images that have been obtained by capturing an image in the direction in which the subject vehicle is advancing using the one pair of the right and left cameras 1100a and 1100b of the stereo camera assembly 1100. In addition, the controller 1200 performs a well-known grouping process on the distance information generated using the principle of triangulation, compares the distance information subjected to the grouping process with three-dimensional solid data set in advance, and thereby detects solid data, white line data, and the like. Accordingly, the controller 1200 can also recognize an indicator of a temporary stop, a stop line, an ETC gate, and the like.

In addition, using the information on the distance to the preceding vehicle (inter-vehicle distance L) generated using the principle of triangulation, the controller 1200 can compute a change amount of the inter-vehicle distance L, and a relative speed V with respect to the preceding vehicle. The change amount of the inter-vehicle distance L can be obtained by integrating inter-vehicle distances L of frame images which are detected per unit time. In addition, the relative speed V can be obtained by dividing an inter-vehicle distance detected per unit time by the unit time. Note that the controller 1400 can also perform the calculations.

The controller 1200 serves as an image analysis processing module of the appended claims in the present implementation, and the image analysis processing module acquires and analyzes image information of the outside of the vehicle which is obtained from the stereo camera assembly 1100 as described above, and transmits environment information of the outside of the vehicle obtained by analyzing the image information to the controller 1400. The controller 1200 analyzes the image information transferred from the stereo camera assembly 1100, recognizes the color of a traffic light ahead of the vehicle, a lighting state of the brake lamps of a preceding vehicle, a road sign, a stop line, the inter-vehicle distance L with the preceding vehicle, or the like as the environment information of the outside of the vehicle, and transfers the information to the controller 1400. In addition, the controller 1200 also serves as an outside-of-vehicle monitoring module of the appended claims in the present implementation, and the outside-of-vehicle monitoring module monitors the outside of the vehicle to acquire environment information thereof.

The acceleration pedal 1300 includes a sensor that detects acceleration operations of a driver. Such an acceleration operation of the driver is transferred to the controller 1400 for the motor as a required driving force of the driver. The controller 1400 decides a step-up voltage of the step-up converter 1600 based on information such as a color of a traffic light, a lighting state of the brake lamps, or an inter-vehicle distance received from the controller 1200 and the required driving force of the driver received from the acceleration pedal 1300, and transmits a step-up command based on the decided step-up voltage to the step-up converter 1600.

The step-up converter 1600 is provided between the high-voltage battery 1500 and the inverter 1700 to step up a voltage of the high-voltage battery 1500 and apply the stepped up voltage to the inverter 1700. Here, a ratio of the stepped up voltage to the voltage of the high-voltage battery 1500 is referred to as a step-up ratio.

Figure 2:
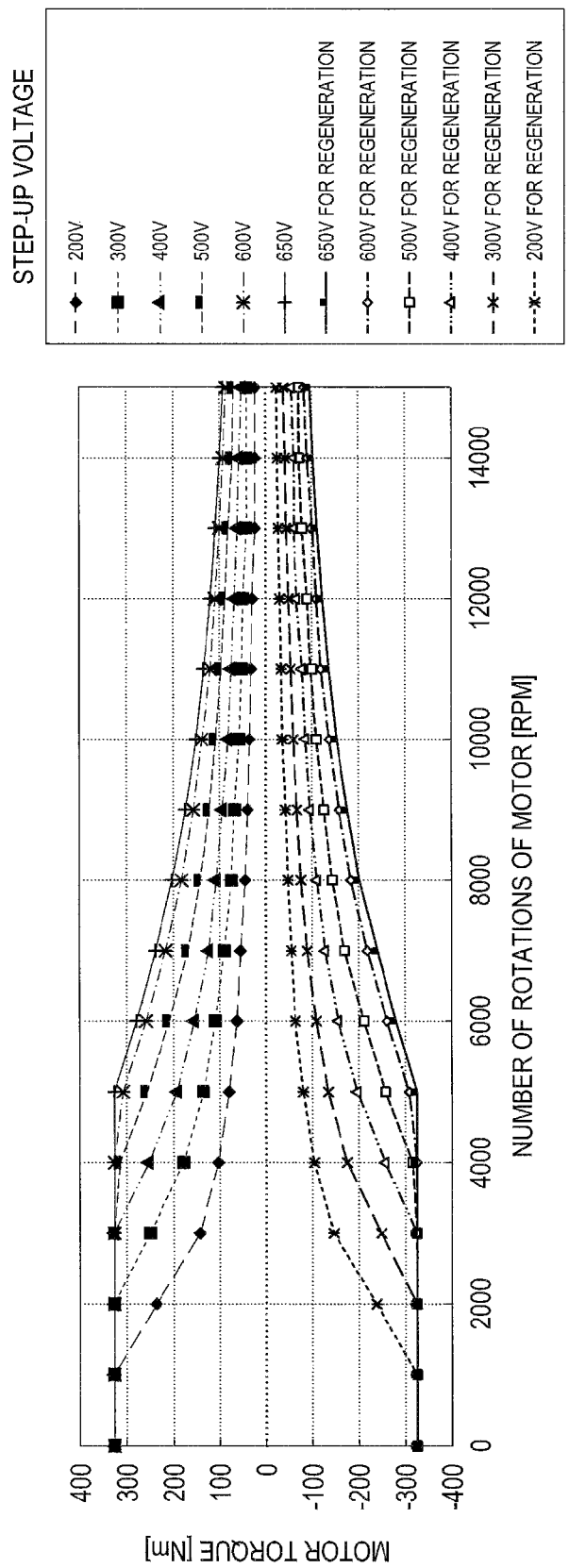
FIG. 2 is a characteristic diagram illustrating a state in which a relation between the number of rotations and motor torque of a driving motor changes according to step-up of a step-up converter.

FIG. 2 is a characteristic diagram illustrating a state in which a relation between the number of rotations and motor torque of the driving motor 1800 changes according to step-up of the step-up converter 1600 (motor output map). The horizontal axis of FIG. 2 represents the number of motor rotations and the vertical axis thereof represents motor torque. In the motor torque on the vertical axis, the positive values represent torque of the driving motor 1800 to drive the drive wheels, and the negative values represent torque of the drive wheels to drive the driving motor 1800 at the time of regeneration (a braking force by the driving motor 1800).

As illustrated in FIG. 2, when motor torque has a positive value, as an amount of step-up by the step-up converter 1600 increases, motor torque with respect to the same number of motor rotations increases. Thus, by increasing the amount of step-up by the step-up converter 1600 to heighten a voltage to be applied to the inverter 1700, the driving motor 1800 can be driven with greater motor torque.

In addition, as illustrated in FIG. 2, when motor torque has a negative value, as an amount of step-up by the step-up converter 1600 increases, motor torque shown when the drive wheels cause the driving motor 1800 to rotate increases.

The driving motor 1800 generates motor torque as described above by causing a current to flow in an armature winding, and thus, a higher current can be caused to flow by increasing a voltage to be applied. As a result, an output can increase.

In addition, FIG. 3 is a schematic diagram illustrating conversion efficiencies of the step-up converter 1600. As illustrated in FIG. 3, a voltage of the high-voltage battery 1500 is 200 V, a step-up ratio of the step-up converter 1600 changes in the range from 1 to 3.250, and the voltage of the high-voltage battery 1500 is stepped up in the range from 200 V to 650 V and then applied to the inverter 1700. Moreover, with regard to a primary power [kW] illustrated in FIG. 3, positive values represent electric power taken from the high-voltage battery 1500 when the motor is driven, and negative values represent electric power charged to the high-voltage battery 1500 at the time of regeneration. FIG. 3 illustrates conversion efficiencies (%) of the step-up converter 1600 for the respective values of the primary power. The step-up converter 1600 needs to feed power to a reactor for step-up, and to cause a greater current to flow by lengthening a power feeding time in order to obtain a higher step-up voltage, and thus, as the step-up ratio of the step-up converter 1600 increases, the conversion efficiency of the step-up converter 1600 becomes lower as illustrated in FIG. 3. In other words, the conversion efficiency becomes lower as the stepped up voltage of the step-up converter 1600 increases. Thus, setting the step-up ratio of the step-up converter 1600 to be low except when necessary is desirable. Note that the lowered amount of the efficiency is radiated as heat generated by the step-up converter 1600. Note that the characteristics of FIGS. 2 and 3 are the same in driving motors 2800 and 3800, step-up converters 2600 and 3600, and high-voltage batteries 2500 and 3500 of second and third implementations.

The controller 1400 predicts a future travel state (starting, stopping, acceleration, deceleration, or the like) of a vehicle using various kinds of information such as a color of a traffic light, a lighting state of brake lamps, a road sign, a stop line, and an inter-vehicle distance L with a preceding vehicle ahead of the vehicle which are obtained from the controller 1200. In addition, the controller 1400 controls a voltage and driving of the step-up converter 1600 based on the predicted future travel state in addition to a required driving force that a driver requires. In other words, the controller 1400 serves as a driving state forecast module of the appended claims in the present implementation, and the driving state forecast module forecasts a driving state including starting or stopping of the vehicle based on environment information of the outside of the vehicle transferred from the controller 1200, and also as the step-up control module that controls step-up by the step-up converter 1600 based on the forecast driving state. Accordingly, when the vehicle is predicted to stop in the future, for example, when the color of a traffic light ahead of the vehicle changes from "green" to "red" during travel of the vehicle, a loss of the step-up converter 1600 can be suppressed to a minimum by lowering the step-up ratio of the step-up converter 1600. In addition, when the color of a traffic light ahead of the vehicle changes from "red" to "green" while the vehicle is stopped, the step-up ratio can be heightened before the driver depresses the acceleration pedal. The step-up ratio can be accordingly heightened before the vehicle starts, and thus, lagging acceleration that occurs when the step-up ratio is heightened after depression of the acceleration pedal can be reliably suppressed.

The step-up converter 1600 steps up the voltage of the high-voltage battery 1500 based on the step-up command from the controller 1400, and then applies the stepped up voltage to the inverter 1700. The inverter 1700 uses the voltage stepped up by the step-up converter 1600 to convert the voltage from DC to AC and then to apply the converted voltage to the driving motor 1800, and thereby causes a current to flow in a motor winding of the driving motor 1800. The driving motor 1800 generates a driving force for moving the vehicle using an electromagnetic force generated by the current that is caused to flow in the motor wiring by the inverter 1700 and a magnetic force of a magnet mounted inside the driving motor 1800.

According to the system 1000 of the present implementation configured as described above, the controller 1400 decides a step-up voltage of the step-up converter 1600 based on various kinds of information such as a color of a traffic light, a lighting state of brake lamps, a road sign, a stop line, and an inter-vehicle distance L with a preceding vehicle that are received from the controller 1200 and a required driving force of a driver that is received from the acceleration pedal 1300.

Thus, when the vehicle is predicted to start such as when the color of the traffic light ahead of the vehicle changes from "red" to "green" while the vehicle is stopped, when the brake lamps of the preceding vehicle turn on, or when the vehicle is separated a set inter-vehicle distance or further from the preceding vehicle, the step-up ratio of the step-up converter 1600 is heightened before the vehicle starts, and thereby drivability can be improved without lagging acceleration upon starting.

In addition, when the vehicle is forecast to stop soon such as when the traffic light ahead of the vehicle is red, when the brake lamps of a preceding vehicle are on, or when the inter-vehicle distance with the preceding vehicle becomes shorter while the vehicle is traveling, step-up is set not to be performed by setting the step-up ratio by the step-up converter 1600 to be multiplied by one, and thereby a loss of the step-up converter 1600 can be reliably suppressed.

Figure 4:
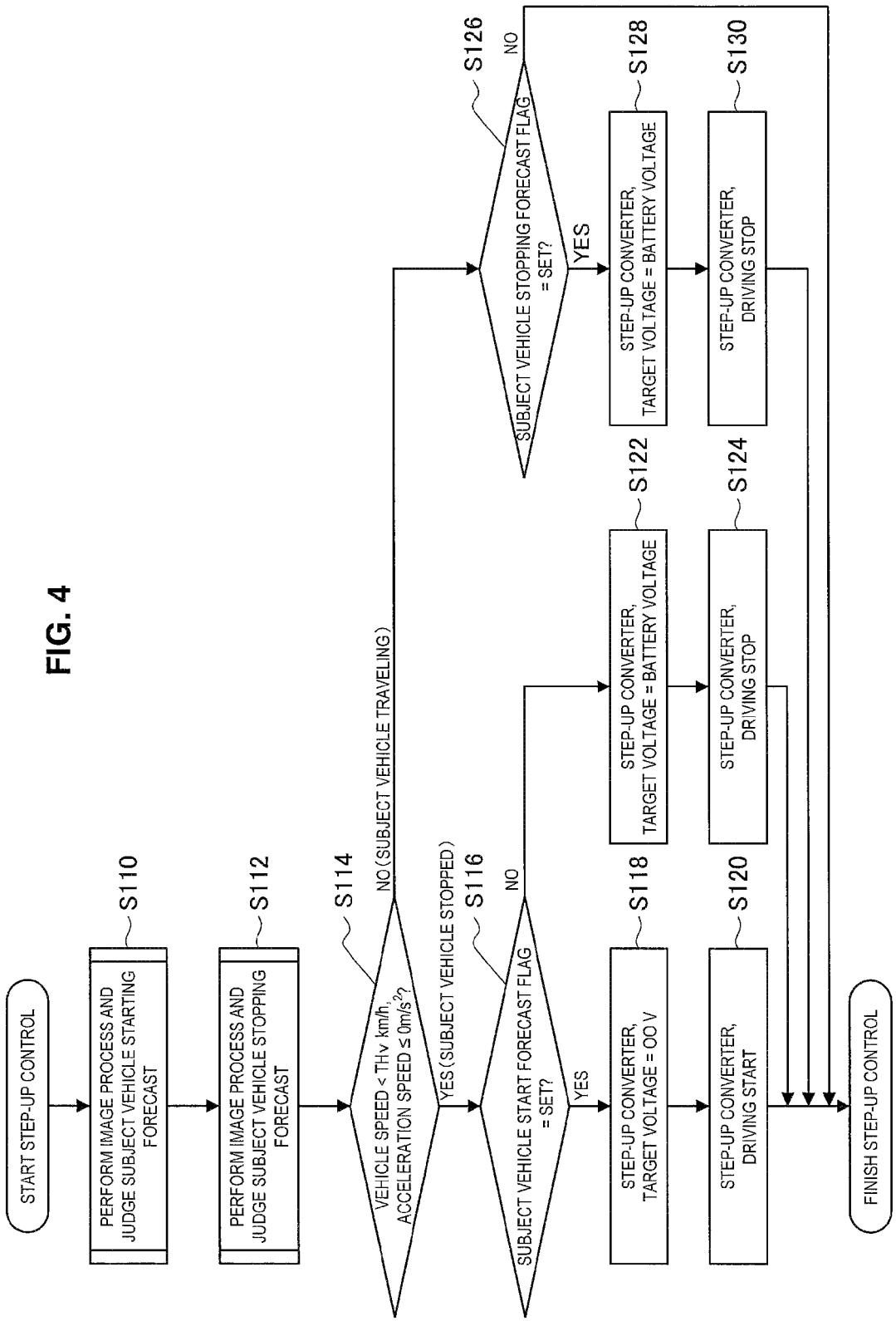
FIG. 4 is a flowchart illustrating a process of the implementation.

Next, an example of the flow of a process performed in the system of FIG. 1 will be described. FIG. 4 is a flowchart illustrating the process of the present implementation. First, in Step S110, a judgment on a forecast of starting of a subject vehicle is made through cooperative control with the stereo camera assembly 1100. Here, it is determined whether or not the conditions C1, C2, and C3 below are satisfied, and when any condition of C1, C2, and C3 is satisfied, the following F1 is executed.

C1) The color of a traffic light ahead of the vehicle has changed from "red" to "green."
C2) The brake lamps of a preceding vehicle have changed from "on" to "off."
C3) The inter-vehicle distance with the preceding vehicle has widened.
F1) Starting of the subject vehicle=Forecast When any condition of C1, C2, and C3 described above is satisfied, the above-described F1 is executed, and a subject vehicle starting forecast flag is set. As described above, the stereo camera assembly 1100 can acquire information on a distance to an object based on the principle of triangulation. In C3 described above, when the information on the distance to the preceding vehicle has been acquired based on the principle of triangulation and the distance to the preceding vehicle exceeds a predetermined value (for example, 10 m), the inter-vehicle distance with the preceding vehicle is determined to have widened.

Next, in Step S112, a judgment on a forecast of stopping of the subject vehicle is made through cooperative control with the stereo camera assembly 1100. Here, it is determined whether or not conditions C4 and C5 below are satisfied, and when either condition of C4 and C5 is satisfied, the following F2 is executed.
C4) The color of the traffic light ahead of the vehicle has changed from "green" to "red."
C5) The inter-vehicle distance with the preceding vehicle is short relative to the vehicle speed.
F2) Stopping of the subject vehicle=Forecast When either condition of C4 and C5 described above is satisfied, F2 described above is executed and a subject vehicle stopping forecast flag is set. In C5 described above, when the information on the distance to the preceding vehicle has been acquired based on the principle of triangulation and the distance from the subject vehicle to the preceding vehicle is expected to be shorter than or equal to the predetermined value (for example, 10 m) based on a relative speed of the subject vehicle to the preceding vehicle, the inter-vehicle distance with the preceding vehicle is determined to be short relative to the vehicle speed.

In the next Step S114, it is determined whether or not the vehicle speed is lower than the predetermined value THv [km/h]. In addition, in Step S114, it is determined whether or not the acceleration speed is 0 m/s$^2$ or lower. Further, in Step S114, when the vehicle speed is lower than the predetermined value THv [km/h] and the acceleration speed is 0 m/s$^2$ or lower, the vehicle is determined to be stopping, and the process proceeds to Step S116. In Step S116, it is determined whether or not the subject vehicle starting forecast flag of Step S110 has been set, and when the subject vehicle starting forecast flag has been set, the process proceeds to Step S118. In Step S118, the target value of a voltage to be applied to the inverter 1700 (target voltage of the step-up converter 1600) is set to a predetermined value V1. Next, in Step S120, driving of the step-up converter 1600 is started.

Accordingly, when the subject vehicle is forecast to start while the vehicle is stopped, the target voltage of the step-up converter 1600 is set to the predetermined value V1 before the acceleration pedal is depressed, and then driving of the step-up converter 1600 is started. Thus, by performing step-up of the step-up converter 1600 before the vehicle starts, lagging acceleration caused by a response delay during step-up can be suppressed.

On the other hand, when the subject vehicle starting forecast flag has not been set in Step S116, the process proceeds to Step S122. In Step S122, starting of the subject vehicle is not forecast, and thus the step-up ratio of the step-up converter 1600 is multiplied by one and the target voltage of the step-up converter 1600 is set to the voltage of the high-voltage battery 1500. Next, in Step S124, driving of the step-up converter 1600 is stopped. In other words, when the process proceeds from Step S122 to S124, step-up is not performed by the step-up converter 1600, and the voltage of the high-voltage battery 1500 is applied to the inverter 1700 without change. The process ends after Steps S120 and S124.

In addition, in Step S114, when the vehicle speed is equal to or higher than the predetermined value THv [km/h] and the acceleration speed is higher than 0 m/s$^2$, the vehicle is determined to be traveling, and the process proceeds to Step S126. In Step S126, it is determined whether or not the subject vehicle stopping forecast flag of Step S112 has been set, and when the subject vehicle stopping forecast flag has been set, the process proceeds to Step S128.

Because the subject vehicle is forecast to stop in Step S128, a driving force is no longer considered to be required for the driver. Thus, the step-up ratio of the step-up converter 1600 is multiplied by one and the target voltage of the step-up converter 1600 is set to the voltage of the high-voltage battery 1500. Next, in Step S130, driving of the step-up converter 1600 is stopped. In other words, when the process proceeds from Step S128 to S130, step-up by the step-up converter 1600 is not performed, and the voltage of the high-voltage battery 1500 is applied to the inverter 1700 without change. The process ends after Step S130. In addition, the process also ends when the subject vehicle stop forecast flag has not been set in Step S126.

Therefore, when the subject vehicle is forecast to stop while traveling, the step-up ratio of the step-up converter 1600 is multiplied by one and the target voltage to be applied to the inverter 1700 (the target voltage of the step-up converter 1600) is set to the voltage of the high-voltage battery 1500. Accordingly, step-up by the step-up converter 1600 is not performed, and thus, a loss of the step-up converter 1600 can be suppressed to a minimum.

Figure 5:
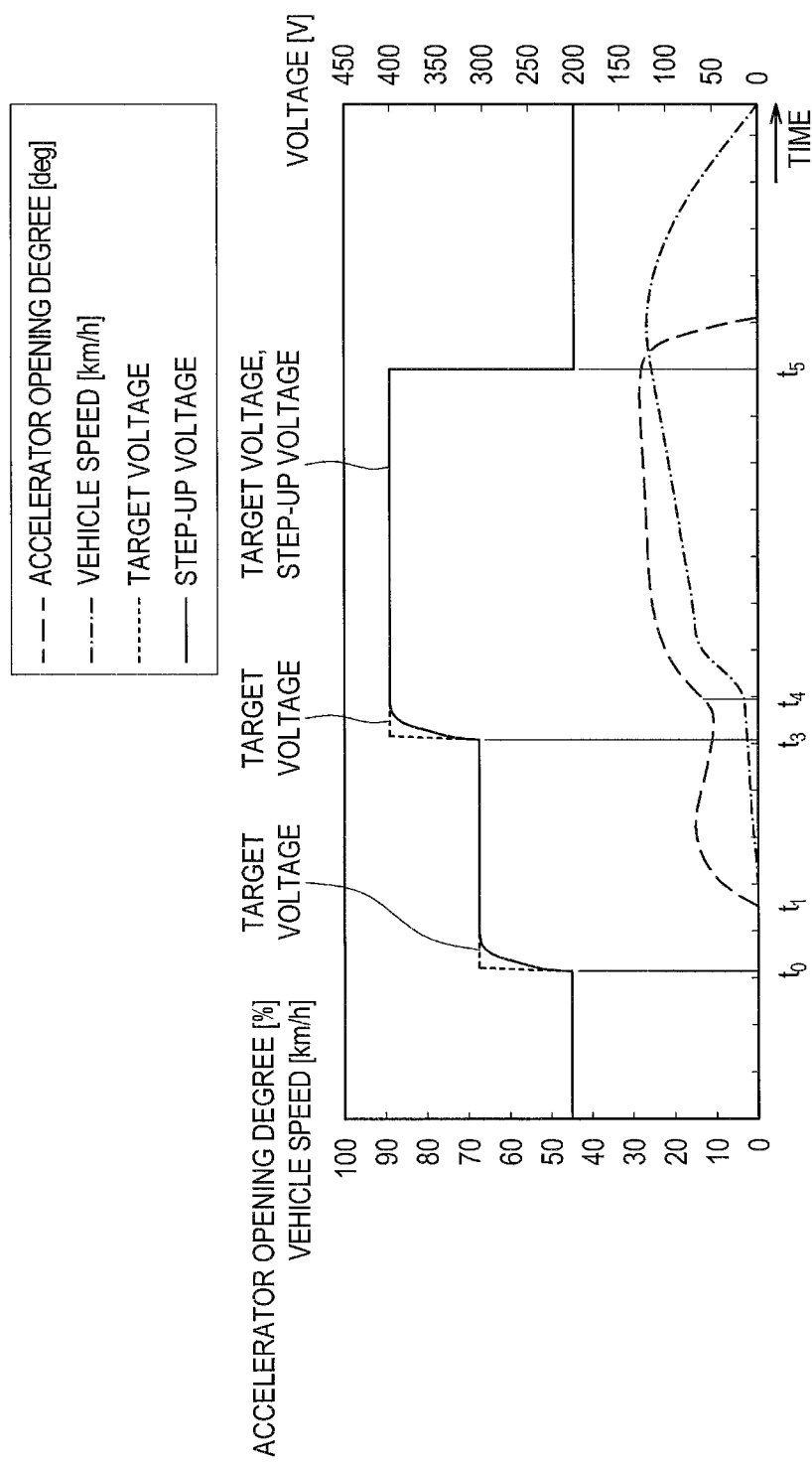
FIG. 5 is a characteristic diagram illustrating requested driving forces (accelerator opening degrees) and a response characteristic of the step-up converter.

FIG. 5 is a characteristic diagram illustrating requested driving forces (accelerator opening degrees) and a response characteristic of the step-up converter. FIG. 5 illustrates that the target step-up voltage by the step-up converter 1600 increases when the vehicle starts and an actual step-up voltage to be applied to the inverter 1700 rises according to the target voltage. The vertical axis on the left of FIG. 5 represents an accelerator opening degree [%] and vehicle speed [km/h], and the vertical axis on the right represents voltage [V]. In addition, the horizontal axis of FIG. 5 represents time.

In the present implementation, when the subject vehicle start forecast flag is set, the target step-up voltage of the step-up converter 1600 is heightened to be 300 V at the time t0 that is earlier than the time t1 at which the accelerator opening degree is greater than 0 as the driver performs an acceleration operation as illustrated in FIG. 5. Considering a delay in a step-up voltage with respect to the target voltage at that moment, the time t0 is set before the time t1. Thereby, the actual step-up voltage to be applied to the inverter 1700 can reach the target voltage (300 V) before the driver depresses the acceleration pedal. Accordingly, lagging acceleration caused by a delay in the actual step-up voltage to be applied to the inverter 1700 with respect to the target voltage and deterioration in drivability can be reliably suppressed. Note that, after the vehicle starts, the target voltage of the step-up converter 1600 is controlled to be an optimum value according to the accelerator opening degree (required driving force of the driver).

Figure 6:
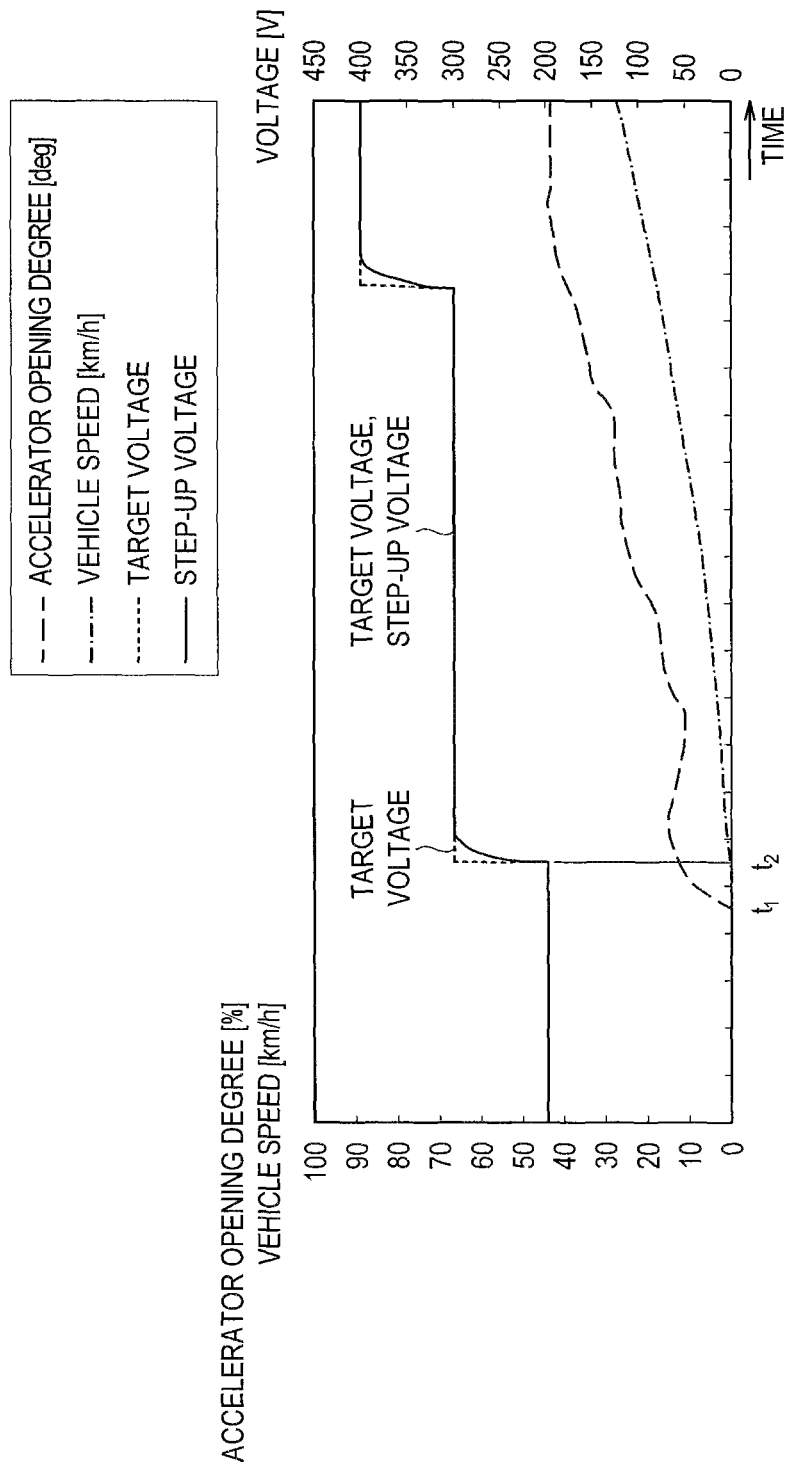
FIG. 6 is a schematic diagram illustrating an example in which an inverter causes a target step-up voltage to increase after a driver depresses an acceleration pedal, as a comparison to FIG. 5.

Meanwhile, FIG. 6 is a schematic diagram illustrating an example in which an inverter causes the target step-up voltage of the step-up converter 1600 to increase after the driver depresses the acceleration pedal, as a comparison to FIG. 5. In the example illustrated in FIG. 6, the target step-up voltage of the step-up converter 1600 is caused to increase according to the required driving force of the driver at the time t2 that is later than the time t1 at which the accelerator opening degree is greater than 0 as the driver performs an acceleration operation. Even though the target voltage is set to increase at the time t2 in this case, a response of the actual step-up voltage is delayed with respect to the target voltage, and thus lagging acceleration and deterioration in drivability occur.

Thus, according to the control of the present implementation illustrated in FIG. 5, the step-up voltage can be heightened by the step-up converter 1600 before the acceleration pedal is depressed and the vehicle starts through the vehicle starting forecast, and thereby lagging acceleration and deterioration in drivability can be reliably suppressed.

In addition, FIG. 5 illustrates a case in which the controller 1200 recognizes that the inter-vehicle distance with the preceding vehicle has sufficiently widened while the vehicle is traveling at the time t3. In this case, the target voltage of the step-up converter 1600 can be controlled to be heightened more before the time t4 at which the driver increases the accelerator opening degree. In the example illustrated in FIG. 5, the target voltage at the time t3 is heightened to be 400 V. Accordingly, the actual step-up voltage at the time t4 at which the driver depresses the acceleration pedal more can be increased to 400 V, and thus lagging acceleration can be suppressed. As described above, it is possible to control the step-up converter 1600 not only by predicting starting but also by anticipating further acceleration while the vehicle is traveling.

Further, FIG. 5 illustrates a case in which a traffic light ahead of the vehicle is recognized as changing from "green" to "red" at the time t5. In this case, the target voltage of the step-up converter 1600 is set to the voltage (=200 V) of the battery at the time t5, and accordingly driving of the step-up converter 1600 is stopped. Thus, a loss of the step-up converter 1600 can be avoided.

Figure 7:
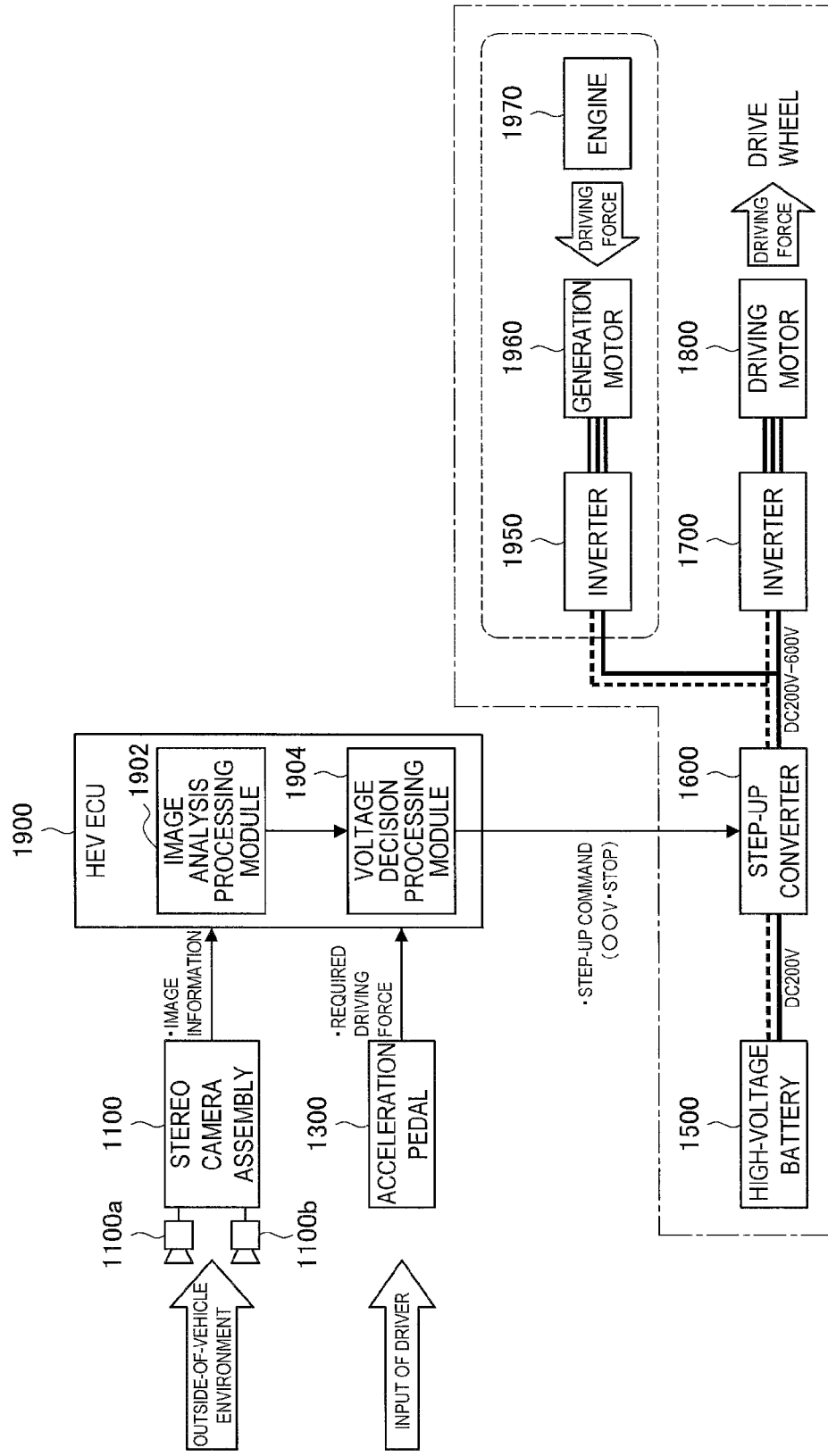
FIG. 7 is a schematic diagram illustrating application of two motors to a hybrid system.

FIG. 7 is a schematic diagram illustrating application of two motors to a hybrid system. The system illustrated in FIG. 7 has the driving motor 1800 for driving a vehicle and a generation motor 1960 for generation, and is used in hybrid vehicles that have motors and engines. In addition, in the example illustrated in FIG. 7, the functions of the two controllers 1200 and 1400 of FIG. 1 are integrated in one hybrid ECU 1900. An image analysis processing module 1902 of the hybrid ECU 1900 corresponds to the function of the controller 1200 of FIG. 1, and a voltage decision processing module 1904 corresponds to the function of the controller 1400 of FIG. 1.

Thus, the configuration example illustrated in FIG. 7 is substantially different from that of FIG. 1 in the point that an inverter 1950, the generation motor 1960, and an engine 1970 that are surrounded by the dashed line in FIG. 7 are added. The generation motor 1960 is driven by the engine 1970 and thereby generates electric power. Electric power generated by the generation motor 1960 is converted from AC to DC by the inverter 1950 and then transferred to the step-up converter 1600 to charge the high-voltage battery 1500.

Figure 8:
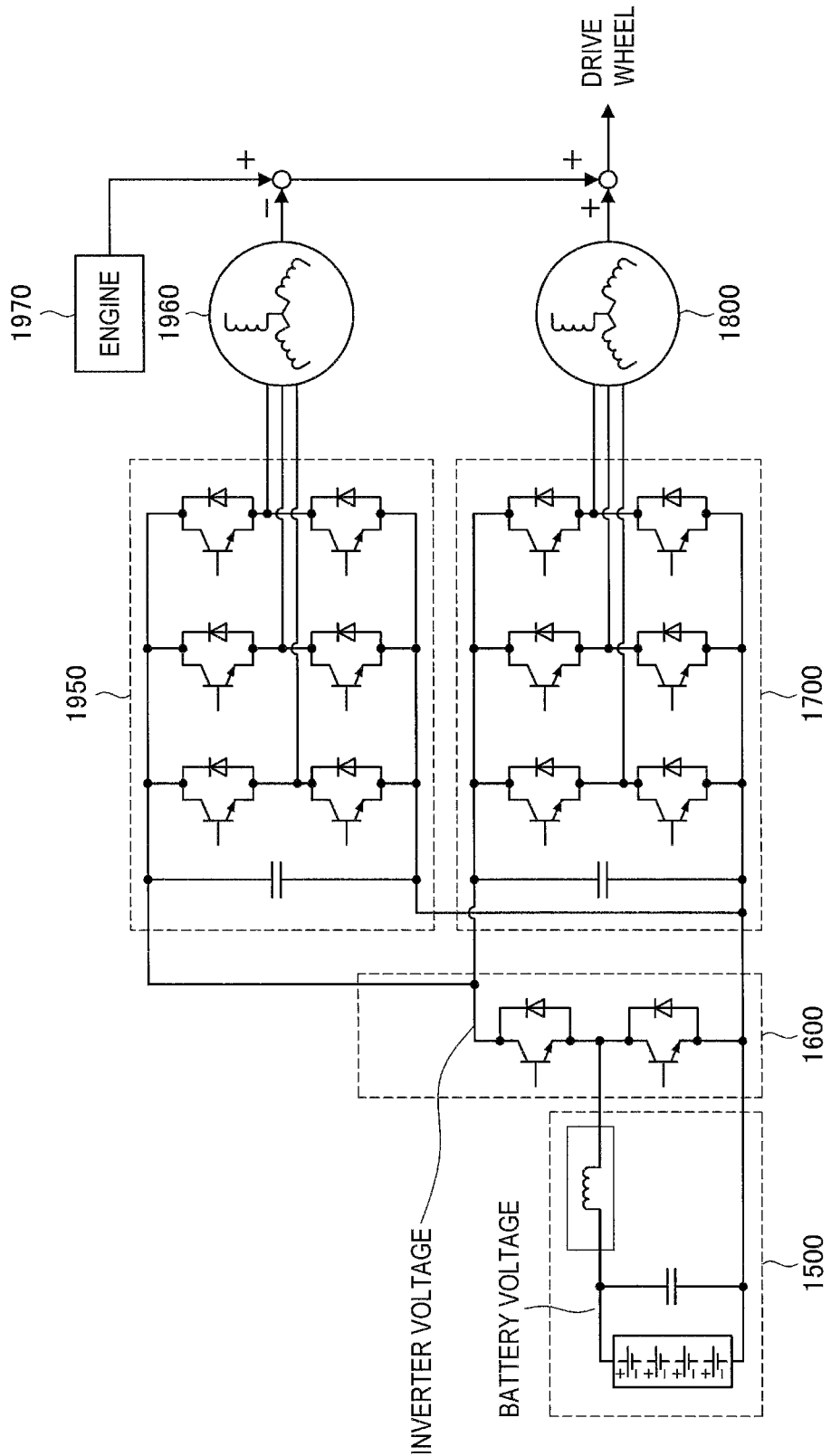
FIG. 8 is a schematic diagram illustrating a specific configuration of a portion surrounded by a dashed-dotted line of the configuration illustrated in FIG. 7.

In addition, FIG. 8 is a schematic diagram (circuit diagram) illustrating a specific configuration of the high-voltage battery 1500, the step-up converter 1600, the inverter 1700, the driving motor 1800, the inverter 1950, and the generation motor 1960 surrounded by the dashed-dotted line of the configuration illustrated in FIG. 7.

Also in the two-motor system as illustrated in FIGS. 7 and 8, the step-up ratio of the step-up converter 1600 can be optimally controlled by forecasting a future driving state including starting or stopping of a vehicle, as in the system of FIG. 1. Thus, by setting the step-up voltage to be high before the driver depresses the acceleration pedal when starting of a vehicle is forecast, lagging acceleration and deterioration of drivability can be reliably suppressed. In addition, by lowering the step-up ratio when stopping of a vehicle is forecast while the vehicle is traveling, a loss of the step-up converter 1600 can be suppressed to a minimum.

According to the first implementation as described above, a future driving state including starting or stopping of a vehicle is forecast based on information recognized by the stereo camera assembly 1100, and the step-up ratio of the step-up converter 1600 is controlled based on the forecast. Accordingly, the step-up ratio of the step-up converter can be optimally controlled based on the future driving state including starting or stopping of the vehicle. Thus, lagging acceleration upon starting and deterioration in drivability can be suppressed, and a loss of the step-up converter 1600 can be reliably reduced. Therefore, according to the present implementation, by anticipating a driving state including starting or stopping of a vehicle and suppressing step-up of a battery, drivability can be improved and a loss can be suppressed to a minimum.

2. Second Implementation

Figure 9:
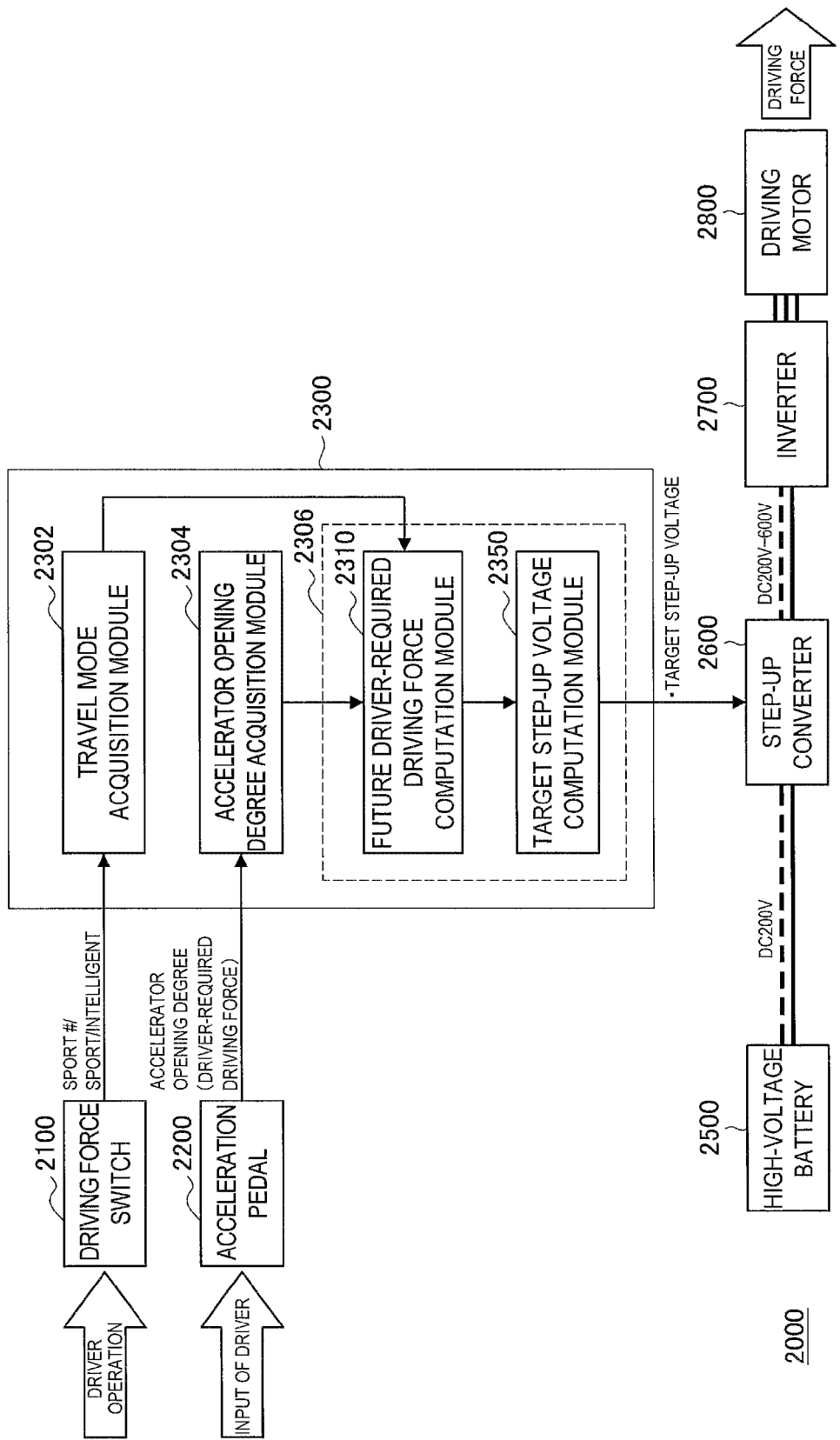
FIG. 9 is a schematic diagram illustrating a system according to an implementation of the present disclosure.

Next, the second implementation of the present disclosure will be described. A configuration of a system 2000 according to the second implementation of the present disclosure will be described with reference to FIG. 9. FIG. 9 is a schematic diagram illustrating the system 2000 according to the second implementation of the present disclosure for driving a vehicle such as an electric automobile or the like. As illustrated in FIG. 9, the system 2000 includes a driving force switch 2100, an acceleration pedal 2200, a hybrid ECU 2300, a high-voltage battery 2500, a step-up converter 2600, an inverter 2700, and a driving motor 2800.

A system for driving a vehicle such as a hybrid automobile or an electric automobile has a driving motor for driving drive wheels. In the configuration illustrated in FIG. 9, the driving motor 2800 can generate a higher output as the voltage of the inverter 2700 which converts a DC current into an AC current becomes higher. For this reason, a voltage of the high-voltage battery 2500 is stepped up by the step-up converter 2600 and applied to the inverter 2700. Meanwhile, when the voltage of the high-voltage battery 2500 is stepped up, a loss of the step-up converter 2600 occurs according to an increase in the amount of step-up. The amount of the loss increases as the step-up ratio of the step-up converter 2600 becomes higher, and thus, a high output leads to an increase of a loss of the step-up converter 2600. Further, in order to step up the voltage of the high-voltage battery 2500 to the maximum voltage of the inverter 2700, a period of a delay of about 200 ms is taken until actual step-up for a target voltage is performed. For this reason, even if step-up is performed when a vehicle is started, actual step-up is delayed until after it is started, and thus a feeling of lagging acceleration or deterioration in drivability occurs. Particularly, there are demands to suppress a loss caused by step-up to a minimum level and improve drivability by optimally controlling step-up of a voltage of the battery according to a travel mode that relates to an output characteristic of the driving motor.

The driving force switch 2100 is mounted at a position at which the driver inside the vehicle can perform an operation of switching a travel mode according to the operation. As an example in the present implementation, three modes i.e., a sport sharp (#) mode, a sport mode, and an intelligent mode can be switched to be set through operations of the driving force switch 2100. Specifically, in the sport sharp (#) mode, response to an acceleration operation performed by a driver is performed more sensitively so as to correspond to dynamic driving even in a high rotation range. In the sport mode, comfortable and sporty driving can be enjoyed in a broad range of applications with output characteristics in which acceleration operations are fully reflected. In the intelligent mode, driver-friendliness and excellent performance in actual fuel efficiency are realized with output characteristics being smooth and sufficiently practical in actual spheres such as urban driving. The driving force switch 2100 transmits a travel mode selected by the driver to the hybrid ECU 2300.

The acceleration pedal 2200 includes a sensor that detects acceleration operations of the driver. Acceleration operations of the driver are transferred to the hybrid ECU 2300 as a required driving force of the driver.

The hybrid ECU 2300 has a travel mode acquisition module 2302 that acquires a travel mode according to an operation of the driving force switch 2100, an accelerator opening degree acquisition module 2304 that acquires an accelerator opening degree, a future driver-required driving force computation module 2310, and a target step-up voltage computation module 2350. In addition, the future driver-required driving force computation module 2310 and the target step-up voltage computation module 2350 constitute a step-up control module 2306.

The step-up converter 2600 is provided between the high-voltage battery 2500 and the inverter 2700 to step up the voltage of the high-voltage battery 2500 and apply the stepped up voltage to the inverter 2700. Here, the ratio of the stepped up voltage to the voltage of the high-voltage battery 2500 is referred to as a step-up ratio.

The step-up converter 2600 steps up the voltage of the high-voltage battery 2500 and applies the stepped up voltage to the inverter 2700 based on a step-up command from the hybrid ECU 2300. The inverter 2700 uses the voltage stepped up by the step-up converter 2600 to convert the voltage from DC to AC and then to apply the converted voltage to the driving motor 2800, and thereby causes a current to flow in a motor winding of the driving motor 2800. The driving motor 2800 generates a driving force for moving the vehicle using an electromagnetic force generated from a magnetic field generated by the current being caused to flow in the motor wiring by the inverter 2700 and a magnetic force of a magnet mounted inside the driving motor 2800.

In the present implementation, the hybrid ECU 2300 computes a future driver-required driving force according to a state of the driving force switch 2100, computes an optimum target step-up voltage according to the future driver-required driving force, and thereby controls step-up by the step-up converter 2600 to a necessary minimum. Here, the future driver-required driving force is a maximum value of the driving force that the driver can require in the future. The future driver-required driving force is the smaller value between the maximum driving force computed from a driving force map and [the current driving force+upper limit of a driving force change rate].

Figure 10A:
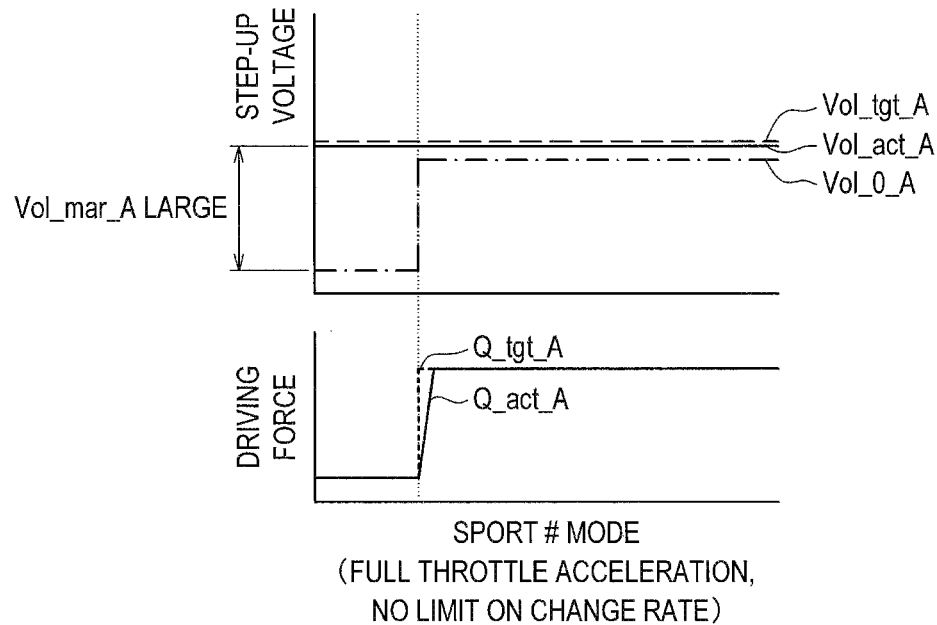
FIG. 10A is a diagram for describing a relation between a travel mode and a size of a voltage margin.
Figure 10B:
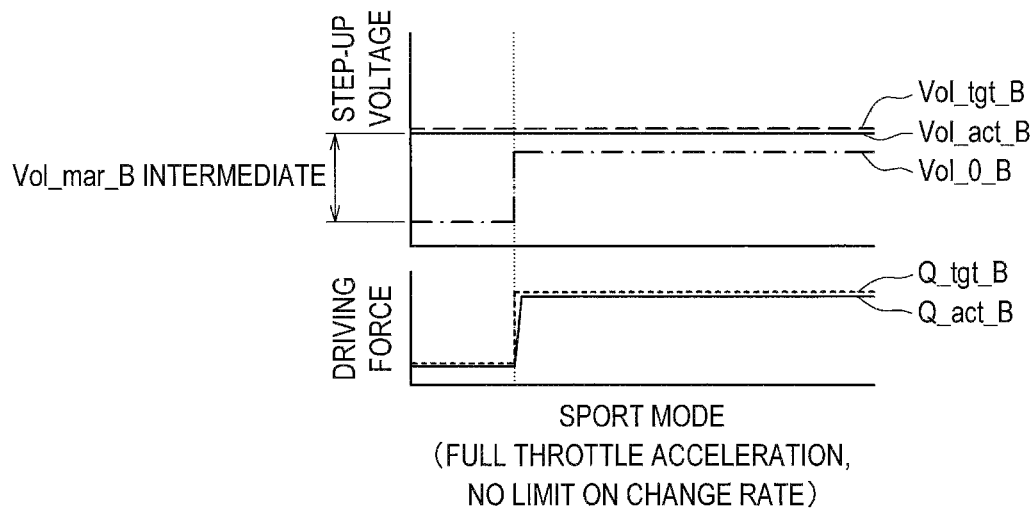
FIG. 10B is a diagram for describing a relation between another travel mode and a size of a voltage margin.
Figure 10C:
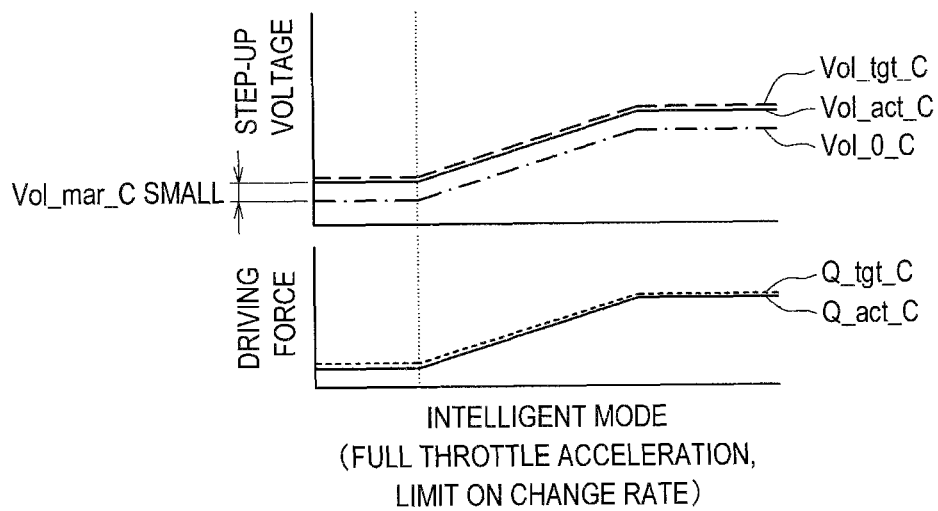
FIG. 10C is a diagram for describing a relation between still another travel mode and a size of a voltage margin.

FIGS. 10A, 10B, and 10C are diagrams for describing relations between the travel modes and sizes of voltage margins. Note that "target step-up voltage" means a target value of a voltage to be stepped up by the step-up converter 2600. As an example, the target step-up voltage is set to about 200 V to 650 V as described above. "Necessary step-up voltage" means a minimum step-up voltage necessary for outputting a target driving force, and "actual step-up voltage" means a voltage that the step-up converter actually outputs. When the actual step-up voltage falls below the necessary step-up voltage, it is not possible to output the target driving force. In addition, there are cases in which, although the actual step-up voltage is controlled to have substantially the same value as the target step-up voltage, a response of the actual step-up voltage is delayed relative to the target step-up voltage. In addition, "target driving force (=required driving force)" means a driving force required according to an acceleration operation of a driver, and "actual driving force" means a driving force that the driving motor 2800 actually generates. The "actual driving force" is output without a response delay as long as the necessary step-up voltage is ensured.

The vertical axes of FIGS. 10A, 10B, and 10C each represent step-up voltage (relative value) and driving force (relative value), and the horizontal axes thereof each represent time. In addition, in each of FIGS. 10A, 10B, and 10C, the dashed lines indicating the step-up voltage represent target step-up voltages Vol_tgt_A, Vol_tgt_B, and Vol_tgt_C, the solid lines represent actual step-up voltages Vol_act_A, Vol_act_B, and Vol_act_C, and the dashed-dotted lines represent necessary step-up voltages Vol_O_A, Vol_O_B, and Vol_O_C. In addition, the dashed lines indicating driving forces represent required driving forces of a next control cycle Q_tgt_A, Q_tgt_B, and Q_tgt_C, and the solid lines represent current required driving forces (actual driving forces) Q_act_A, Q_act_B, and Q_act_C. Moreover, in FIGS. 10A, 10B, and 10C, voltage margins Vol_mar_A, Vol_mar_B, and Vol_mar_C are each the difference between the actual step-up voltage and the necessary step-up voltage.

FIGS. 10A, 10B, and 10C illustrate changes of the step-up voltages (relative values) and driving forces (relative values) in a case of full throttle acceleration of a subject vehicle with a predetermined driving force in each of the sport sharp (#) mode, the sport mode, and the intelligent mode.

As illustrated in FIG. 10A, in order to output a required driving force from the driving motor 2800 according to an acceleration operation performed by a driver in the sport sharp (#) mode, it is necessary to step up a voltage to one with which the upper limit value of the required driving force (=the maximum value; future driver-required driving force) can be realized. For this reason, the voltage margin Vol_mar_A of the sport sharp (#) mode is set to be large.

On the other hand, in the sport mode, the upper limit value of the required driving force (=future driver-required driving force) is set to be lower than that of the sport sharp (#) mode as illustrated in FIG. 10B. Then, the future driver-required driving force lower than that of the sport sharp (#) mode may be output, and thus, the voltage margin Vol_mar_B is smaller than the Vol_mar_A of the sport sharp (#) mode. Accordingly, a loss in electric power of the step-up converter 2600 can be reduced.

In addition, in the intelligent mode, the future driver-required driving force is limited by the upper limit of the change rate in addition to the upper limit value of the required driving force as illustrated in FIG. 10C. Thus, the change rate of the actual step-up voltage Vol_act_C is also limited. In this case, with regard to the future driver-required driving force, a voltage margin that is equivalent to the upper or lower limit of the change rate of the required driving force may be added to the current driver-required driving force, and thus the voltage margin Vol_mar_C is set to be smaller. Therefore, a loss in electric power of the step-up converter 2600 can be reduced more. Particularly, when a change rate of a possible required driving force is lower than a change rate according to step-up response performance of the step-up converter 2600, the voltage margin Vol_mar_C can be zero.

By setting target step-up voltages according to future driver-required driving forces for each travel mode as described above, the voltage margins can be set to necessary minimum values. Accordingly, a target driving force can be ensured and a loss can be suppressed to a minimum.

Figure 11:
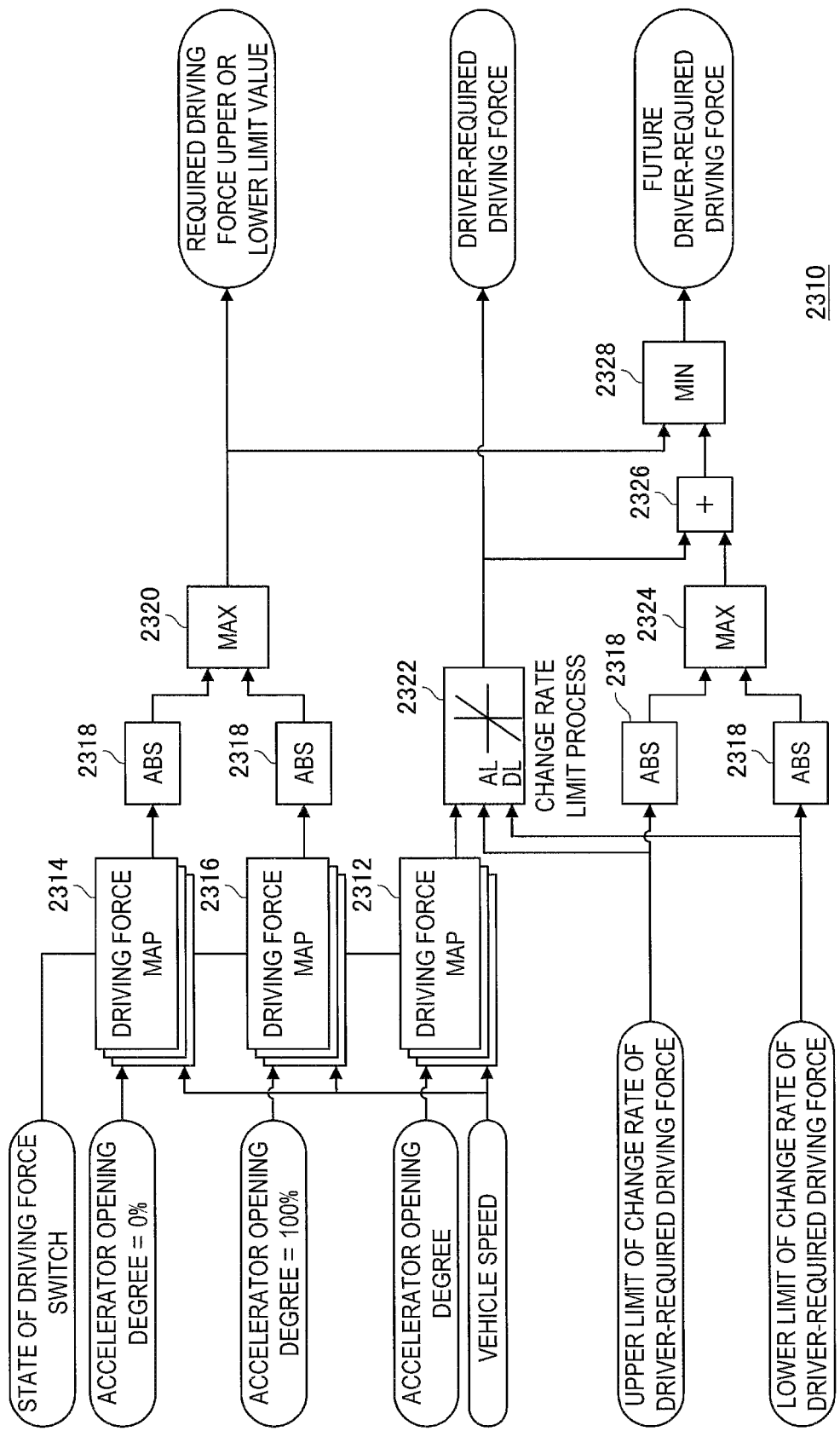
FIG. 11 is a schematic diagram illustrating a configuration of a future driver-required driving force computation module.

Next, a method for computing the future driver-required driving force will be described. FIG. 11 is a schematic diagram illustrating a configuration of the future driver-required driving force computation module 2310. As illustrated in FIG. 11, the future driver-required driving force computation module 2310 has driving force maps 2312, 2314, and 2316, an absolute value computation module (ABS) 2318, a maximum value computation module 2320, a change rate limit processing module 2322, another maximum value computation module 2324, an addition module 2326, and a minimum value computation module 2328.

Each of the driving force maps 2312, 2314, and 2316 has maps each corresponding to the three modes of the sport sharp (#) mode, the sport mode, and the intelligent mode. Each of the driving force maps 2312, 2314, and 2316 selects a map corresponding to an input state of the driving force switch 2100 based on the state of the driving force switch 2100. For example, when the driving force switch 2100 sets the sport sharp (#) mode, the map corresponding to the sport sharp (#) mode is selected among the three maps that the driving force map 2312 has.

The driving force map 2312 receives an accelerator opening degree and a vehicle speed of the current time point. Then, the driving force map 2312 outputs a driving force according to the accelerator opening degree and the vehicle speed based on the map corresponding to the state of the driving force switch 2100.

The driving force map 2314 corresponds to maps at the time of full closing (0%) of the accelerator. The driving force map 2314 selects a map corresponding to a state of the driving force switch 2100 among the three maps that the driving force map 2314 has. In addition, the driving force map 2314 receives the accelerator opening degree (0%) and a vehicle speed. Then, the driving force map 2314 outputs a driving force according to 0% of the accelerator opening degree and the vehicle speed based on the map corresponding to the state of the driving force switch 2100.

The driving force map 2316 corresponds to maps at the time of full opening (100%) of the accelerator. The driving force map 2316 selects a map corresponding to a state of the driving force switch 2100 among the three maps that the driving force map 2316 has. In addition, the driving force map 2316 receives the accelerator opening degree (100%) and a vehicle speed. Then, the driving force map 2316 outputs a driving force according to 100% of the accelerator opening degree and the vehicle speed based on the map corresponding to the state of the driving force switch 2100.

The driving force according to the accelerator opening degree and the vehicle speed output by the driving force map 2312 is input to the change rate limit processing module 2322, and then a change rate limit process is performed. The change rate limit processing module 2322 receives the upper limit value and the lower limit value of the change rate of a driver-required driving force. Then, the change rate limit processing module 2322 limits the driving force input from the driving force map 2312 and outputs the force as a driver-required driving force based on the upper limit value and the lower limit value of the change rate of the driver-required driving force. Through the change rate limit process, forward-backward shaking of the vehicle body caused by a radical change in a driving force is suppressed. The driving motor 2800 is controlled based on the driver-required driving force. In addition, the driver-required driving force is input to the addition module 2326 in order to compute a future driver-required driving force. Note that the change rate limit process can be mainly performed in the intelligent mode.

Furthermore, the absolute values of the respective upper limit value and lower limit value of the change rate of the driver-required driving force are obtained by the absolute value computation module (ABS) 2318 and input to the maximum value computation module 2324. The maximum value computation module 2324 compares the absolute value of the upper limit value of the change rate of the driver-required driving force to that of the lower limit value, and inputs the greater one to the addition module 2326. The addition module 2326 adds the driver-required driving force input from the change rate limit processing module 2322 to the greater one between the absolute value of the upper limit value of the change rate and the absolute value of the lower limit value input from the maximum value computation module 2324. Because an increase or a decrease of the driver-required driving force is limited by the change rate limit processing module 2322, the following relation is satisfied.

Future driver-required driving force<Current driver-required driving force+Upper limit of change rate The value obtained by adding the maximum value of the change rate of the driver-required driving force to the current driver-required driving force described above can be considered as the maximum value that is estimated as the future driver-required driving force. In other words, a value of the future driver-required driving force is set to be smaller than the value obtained by adding the upper limit of the change rate to the current driver-required driving force. Note that the future driver-required driving force can be considered as a maximum driver-required driving force of the next control cycle with respect to the current control cycle. The addition module 2326 calculates the right side of the above expression, and outputs the calculated result to the minimum value computation module 2328.

On the other hand, the respective absolute values of the driving force according to the accelerator opening degree of 0% and the vehicle speed output by the driving force map 2314 and the driving force according to the accelerator opening degree of 100% and the vehicle speed output by the driving force map 2316 are computed by the absolute value computation module (ABS) 2318, and then input to the maximum value computation module 2320. The maximum value computation module 2320 outputs the greater one of the input absolute values as a required driving force upper or lower limit value. In this way, the upper or lower limit value of the driver-required driving force is decided using the driving force map 2314 at the time of full closing of the accelerator and the driving force map 2316 at the time of full opening of the accelerator. The upper or lower limit value is the required driving force at the time of full opening or closing of the accelerator, and thus, the future driver-required driving force will not exceed the upper or lower limit value.

For this reason, the upper or lower limit value of the required driving force is input to the minimum value computation module 2328, and compared to the output from the addition module 2326. Then, the smaller one between the upper or lower limit value of the required driving force and the output from the addition module 2326 is output as the future driver-required driving force. In this way, by combining the limits on the change rate of the change rate limit processing module 2322 and the limit based on the "upper or lower value of the driver-required driving force" together, the upper limit of a driving force that the driver will require in the future can be output as the future driver-required driving force.

Figure 12:
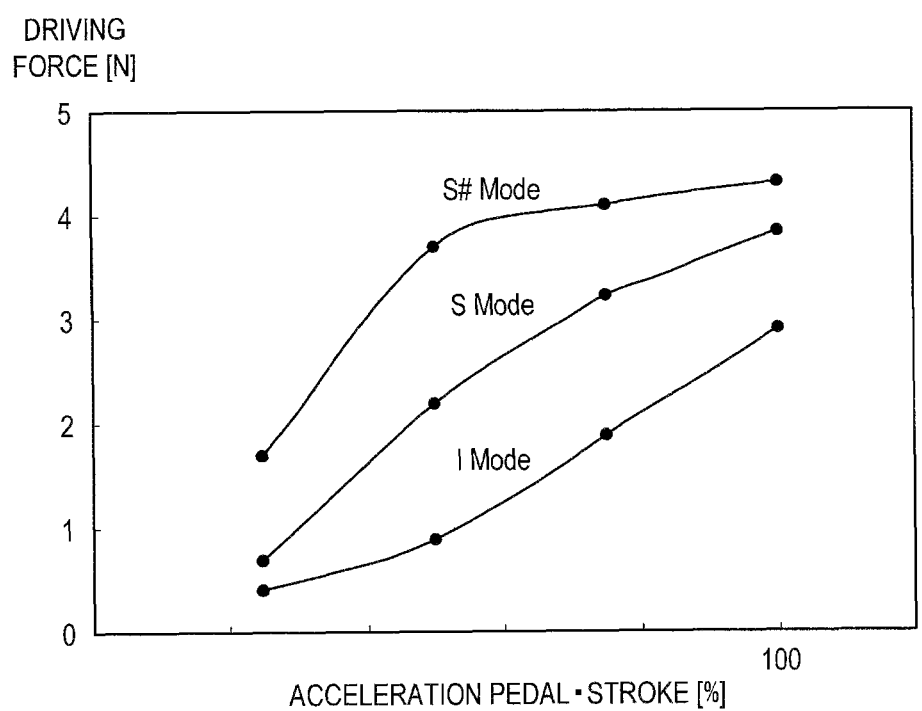
FIG. 12 is a schematic diagram illustrating an example of a driving force map.

FIG. 12 is a schematic diagram illustrating an example of the driving force map 2312. As illustrated in FIG. 12, driving forces according to opening degrees of the acceleration pedal in each of the sport sharp (#) mode (S# Mode), the sport mode (S mode), and the intelligent mode (I Mode) are prescribed. In addition, the map illustrated in FIG. 12 is set for each vehicle speed. Thus, the driving forces according to accelerator opening degrees and vehicle speeds can be obtained from the driving force map 2312. The driving force maps 2314 and 2316 have the same basic configuration as the driving force map 2312; however, the driving force map 2314 prescribes the driving forces when the accelerator opening degree is 0% according to vehicle speeds, and the driving force map 2316 prescribes driving forces when the accelerator opening degree is 100% according to vehicle speeds.

Thus, the future driver-required driving force computation module 2310 of the hybrid ECU 2300 can obtain a future driver-required driving force based on a travel mode set by the driving force switch 2100, an accelerator opening degree, and a vehicle speed.

Figure 13:
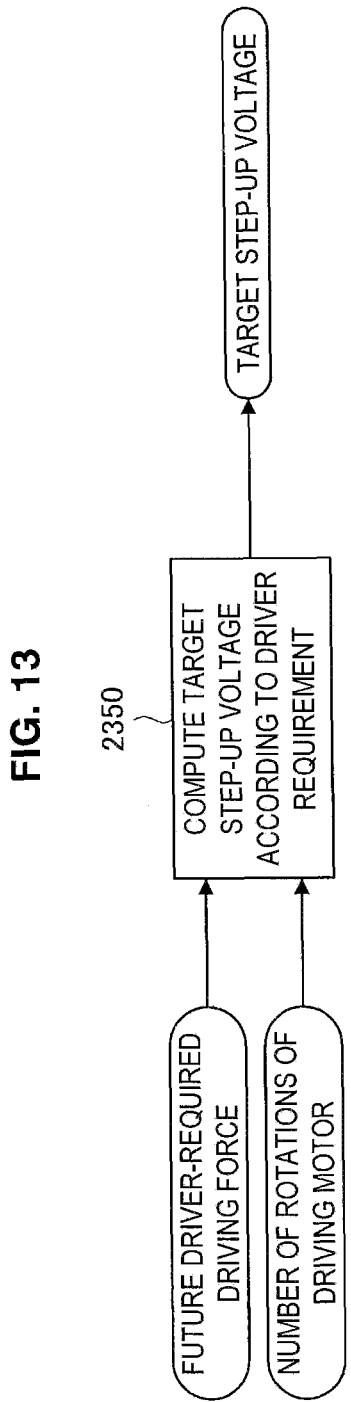
FIG. 13 is a schematic diagram illustrating a configuration example of a target step-up voltage computation module.

Next, a process performed by the target step-up voltage computation module 2350 of the hybrid ECU 2300 will be described. FIG. 13 is a schematic diagram illustrating a configuration example of the target step-up voltage computation module 2350. As illustrated in FIG. 13, the target step-up voltage computation module 2350 receives a future driver-required driving force and the number of rotations of the driving motor 2800. The target step-up voltage computation module 2350 computes a target step-up voltage of the step-up converter 2600 from the future driver-required driving force and the number of rotations of the driving motor 2800.

Figure 14:
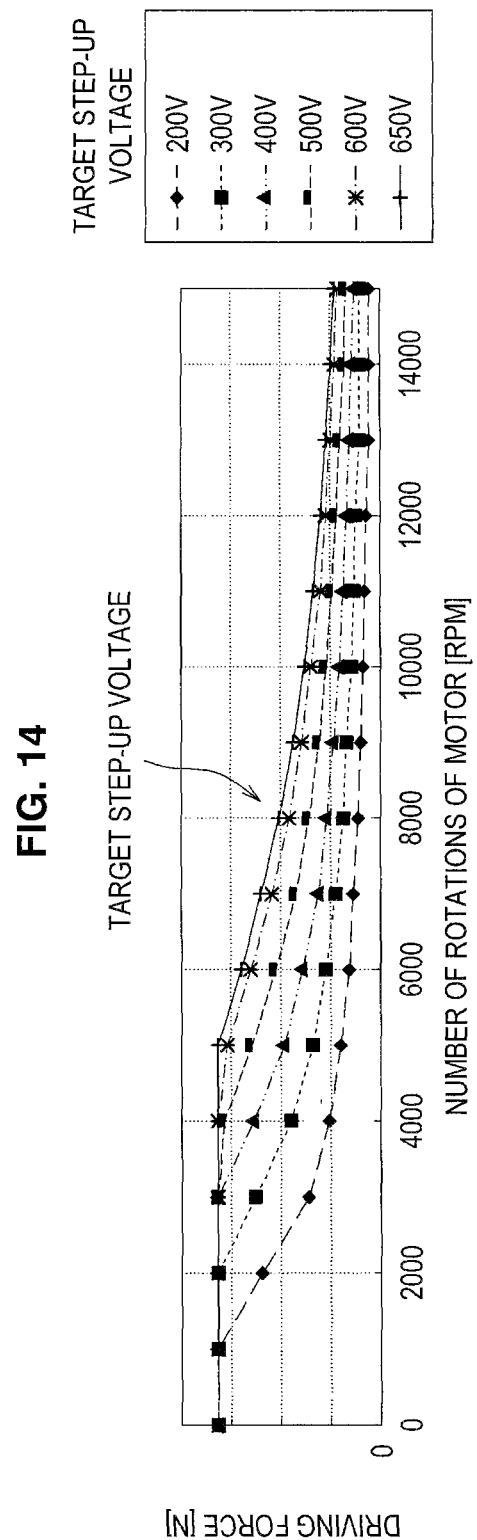
FIG. 14 is a schematic diagram illustrating a map that is used when the target step-up voltage computation module computes target step-up voltages of a step-up converter.

FIG. 14 is a schematic diagram illustrating a map that is used when the target step-up voltage computation module 2350 computes target step-up voltages of the step-up converter 2600. In FIG. 14, the horizontal axis represents the number of rotations of the driving motor 2800 and the vertical axis represents driving forces (future driver-required driving forces) of the driving motor 2800. The map illustrated in FIG. 14 prescribes target step-up voltages (200 V, 300 V, 400 V, 500 V, 600 V, and 650 V) according to the number of rotations of the driving motor 2800 and driving forces (future driver-required driving forces) of the driving motor 2800.

The target step-up voltage computation module 2350 applies an input future driver-required driving force and the number of rotations of the driving motor 2800 to the map of FIG. 14, and then computes a target step-up voltage corresponding to the input future driver-required driving force and the number of rotations of the driving motor 2800. Then, using the target step-up voltage computed by the target step-up voltage computation module 2350, the step-up control module 2306 of the hybrid ECU 2300 transfers a step-up command to the step-up converter 2600.

Thus, the target step-up voltage computation module 2350 computes the target step-up voltage of the step-up converter 2600 from the future driver-required driving force and the number of rotations of the driving motor 2800, and thereby can enable the step-up converter 2600 to perform step-up to the target step-up voltage. By computing a step-up voltage that can realize the future driver-required driving force as the target voltage, the driving force can be output without a delay regardless of how the driver operates the acceleration pedal.

By performing as described above, a future value of a driver-required driving force (future driver-required driving force) is estimated from an operation state of the driving force switch 2100 and the change rate limit process in the present implementation. In addition, a voltage margin is added to a voltage necessary for outputting the current driving force (=necessary step-up voltage), a voltage at which the future driver-required driving force can be output is set as a target step-up voltage, and thereby step-up is controlled. Accordingly, if a voltage obtained from (the necessary step-up voltage+voltage margin) is realized, a driving force can be output without a delay regardless of how the driver operates the acceleration pedal.

In addition, based on an input state of the driving force switch 2100, each of the driving force maps 2312, 2314, and 2316 selects a map corresponding to the state of the driving force switch 2100. Accordingly, a future driver-required driving force can be computed according to a travel mode, and the margin of a target step-up voltage with respect to an actual step-up voltage can be changed according to the travel mode as illustrated in FIGS. 10A, 10B, and 10C.

Accordingly, in the system that includes the driving force switch 2100 that changes the required driving force according to a depression amount of the acceleration pedal and enables the driver to select an acceleration characteristic of the vehicle, when a travel mode having a low acceleration characteristic is selected, responsiveness to a required driving force may be low, and thus a loss in step-up can be reduced by controlling a step-up voltage margin to be small. In addition, when a travel mode having a high acceleration characteristic is selected, a required driving force can be reliably demonstrated instantly by controlling a step-up voltage margin to be large.

According to the second implementation described above, a target step-up voltage of the step-up converter 2600 is designed to be computed from a future driver-required driving force and the number of rotations of the driving motor according to a travel mode. Thereby, a necessary minimum of a step-up voltage margin of the step-up converter 2600 can be secured according to a travel mode, a loss in step-up can be suppressed to a minimum, and a requirement of the driver can be reliably responded to. Therefore, according to the present implementation, a loss in step-up can be suppressed to a minimum and drivability can be improved by optimally controlling step-up of a voltage of the battery according to a travel mode relating to an output characteristic of the driving motor.

3. Third Implementation

Figure 15:
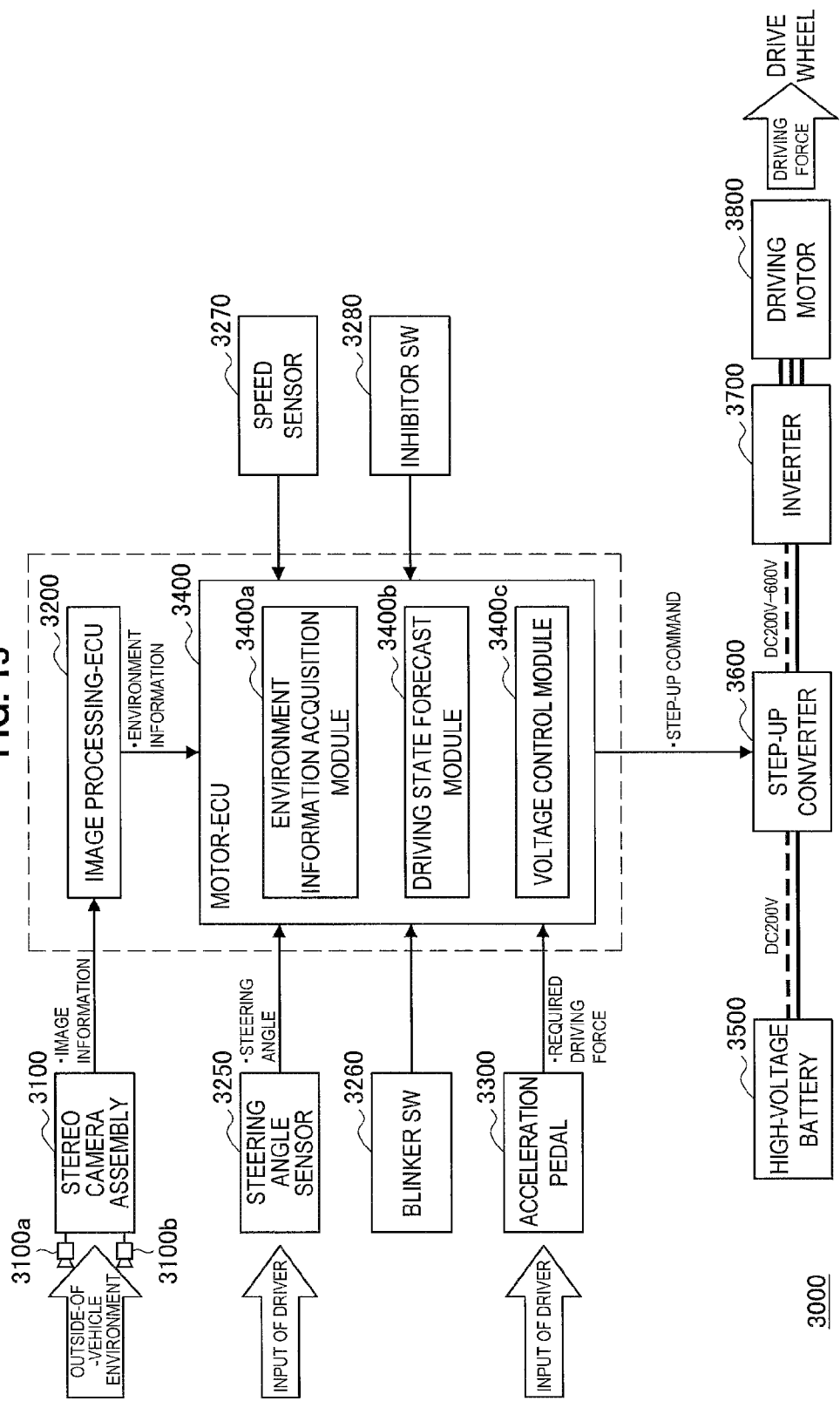
FIG. 15 is a schematic diagram illustrating a system according to an implementation of the present disclosure.

Next, a configuration of a system 3000 according to a third implementation of the present disclosure will be described with reference to FIG. 15. FIG. 15 is a schematic diagram illustrating the system 3000 according to the third implementation of the present disclosure for driving a vehicle such as an electric automobile. Note that, although an electric automobile is illustrated herein, the system 3000 according to the third implementation can also be applied to a wide range of other vehicles such as a hybrid automobile. As illustrated in FIG. 15, the system 3000 includes a stereo camera assembly 3100, a controller 3200 for the stereo camera assembly (image processing-ECU (image analysis processing module)), a steering angle sensor 3250, a blinker switch (SW) 3260, a speed sensor 3270, an inhibitor switch (SW) 3280, an acceleration pedal 3300, a controller 3400 for a motor (motor-ECU), a high-voltage battery 3500, a step-up converter (step-up module) 3600, an inverter 3700, and a driving motor 3800. Note that, although FIG. 15 illustrates an example in which the controller 3200 for the stereo camera assembly and the controller 3400 for the motor are formed as separate units, they may be formed as one controller.

A system for driving a vehicle such as a hybrid automobile or an electric automobile has a driving motor for driving drive wheels. In the configuration illustrated in FIG. 15, the driving motor 3800 can generate a higher output as a voltage of the inverter 3700 that converts a voltage from DC to AC becomes higher. For this reason, a voltage of the high-voltage battery 3500 is stepped up by the step-up converter 3600 and then applied to the inverter 3700. On the other hand, when a voltage of the high-voltage battery 3500 is stepped up, a loss occurs in the step-up converter 3600 according to an increase in the stepped-up voltage. The loss increases as a step-up ratio of the step-up converter 3600 becomes higher, and thus, a high output leads to an increase of a loss of the step-up converter 3600. Further, in order to step up a voltage of the high-voltage battery 3500 to the maximum voltage of the inverter 3700, a period of a delay of about 200 ms is taken until actual step-up for a target voltage is performed. For this reason, even if step-up is performed when the vehicle passes a preceding vehicle, actual step-up is delayed until after the passage starts, and thus a feeling of lagging acceleration or deterioration in drivability occurs. Particularly, when acceleration for passing is forecast, a loss in step-up is required to be suppressed to a minimum by optically controlling a voltage margin necessary for acceleration for passing to perform the step-up.

As a situation in which the driving motor 3800 generates a high output, for example, one in which a vehicle starts, passes a preceding vehicle on a highway, or the like is exemplified. Focusing on the situation in which the vehicle passes a preceding vehicle on a highway, the system 3000 according to the present implementation detects, for example, deviation from a driving lane and movement to a passing lane using image information from the stereo camera assembly 3100 and then controls the step-up converter 3600 to raise the step-up ratio.

In the configuration illustrated in FIG. 15, the stereo camera assembly 3100 has one pair of right and left cameras 3100a and 3100b each having an image sensor such as a CCD sensor or a CMOS sensor, captures an external environment of the outside of the vehicle and transfers the captured image information to the controller 3200. The stereo camera assembly 3100 according to the present implementation is constituted by color cameras that can acquire color information as an example. The stereo camera assembly 3100 can recognize the color white in a lane in which a subject vehicle and a preceding vehicle ahead of the subject vehicle travel as image information. The stereo camera assembly 3100 can recognize, as a preceding vehicle ahead of the subject vehicle, a preceding vehicle in a lane other than the lane in which the subject vehicle travels as image information, in addition to the preceding vehicle in the lane in which the subject vehicle travels. Furthermore, the stereo camera assembly 3100 can acquire color information, and thus, it can also recognize, for example, a lighting state of the brake lamps of a vehicle traveling ahead of the vehicle, a color of a traffic light, road signs, and the like as image information. The stereo camera assembly 3100 outputs the recognized image information to the controller 3200.

The controller 3200 can generate and acquire distance information to an object from a deviation amount of a corresponding position using the principle of triangulation from a set of right and left stereo images that have been obtained by capturing an image in the direction in which the subject vehicle is advancing using the one set of the right and left cameras 3100a and 3100b of the stereo camera assembly 3100. In addition, the controller 3200 performs a well-known grouping process on the distance information generated using the principle of triangulation, compares the distance information subjected to the grouping process with three-dimensional solid data set in advance, and thereby detects solid data, white line data, and the like. Accordingly, the controller 3200 can also recognize an indicator of a temporary stop, a stop line, an ETC gate, and the like, in addition to a preceding vehicle or a white line indicating a driving lane.

In addition, using the information on the distance to the preceding vehicle (inter-vehicle distance L) generated using the principle of triangulation, the controller 3200 can compute a change amount of the inter-vehicle distance L, and a relative speed V with respect to the preceding vehicle. The change amount of the inter-vehicle distance L can be obtained by integrating inter-vehicle distances L of frame images which are detected per unit time. In addition, the relative speed V can be obtained by dividing an inter-vehicle distance detected per unit time by the unit time. Note that the controller 3400 can also perform the calculations.

The controller 3200 serves as an image analysis processing module that acquires and analyzes image information of the outside of the vehicle which is obtained from the stereo camera assembly 3100 as described above, and transmits environment information of the outside of the vehicle obtained by analyzing the image information to the controller 3400. The controller 3200 analyzes the image information transferred from the stereo camera assembly 3100, recognizes the distance to a preceding vehicle traveling ahead of the subject vehicle, a white line on a road indicating a driving lane, and the like as the environment information of the outside of the vehicle, and transfers the information to the controller 3400. In addition, the controller 3200 recognizes the color of a traffic light ahead of the subject vehicle, a lighting state of the brake lamps of a preceding vehicle, a road sign, a stop line, the inter-vehicle distance L with the preceding vehicle, or the like as the environment information of the outside of the vehicle, and transfers the information to the controller 3400. To be more specific, the controller 3200 can transfer the inter-vehicle distance with a preceding vehicle in the lane in which the subject vehicle travels, the inter-vehicle distance with a preceding vehicle in a lane adjacent to the lane in which the subject vehicle travels (the right lane or the left lane), and information indicating whether or not the subject vehicle has deviated from its driving lane (right deviation, left deviation, or no deviation) to the controller 3400 as the environment information.

The steering angle sensor 3250 detects a steering angle of front wheels according to a steering operation by a driver. The steering angle detected by the steering angle sensor 3250 is transferred to the controller 3400. The blinker switch 3260 detects an operation state of a blinker by the driver. The detected operation state of the blinker is transferred to the controller 3400.

The acceleration pedal 3300 includes a sensor that detects an acceleration operation by the driver. The acceleration operation by the driver is transferred to the controller 3400 for the motor as a required driving force of the driver. The controller 3400 determines whether or not the subject vehicle is traveling in a lane, or has deviated from the lane in order to pass the preceding vehicle traveling in the same lane as the subject vehicle based on the distance to the preceding vehicle ahead of the subject vehicle and the environment information of the outside of the vehicle such as a white line indicating the driving lane which are received from the controller 3200. Furthermore, the controller 3400 decides a step-up voltage of the step-up converter 3600 based on the determination, and transmits a step-up command based on the decided step-up voltage to the step-up converter 3600. Note that the controller 3200 and the controller 3400 may be formed in one body as described above, and a configuration of the controller 3200 and the controller 3400 is not particularly limited as long as it has the functions of analyzing images and causing the step-up converter 3600 to perform step-up.

The step-up converter 3600 is provided between the high-voltage battery 3500 and the inverter 3700, steps up a voltage of the high-voltage battery 3500, and then applies the stepped up voltage to the inverter 3700. Here, the ratio of the stepped up voltage to the voltage of the high-voltage battery 3500 is referred to as a step-up ratio.

Figure 16:
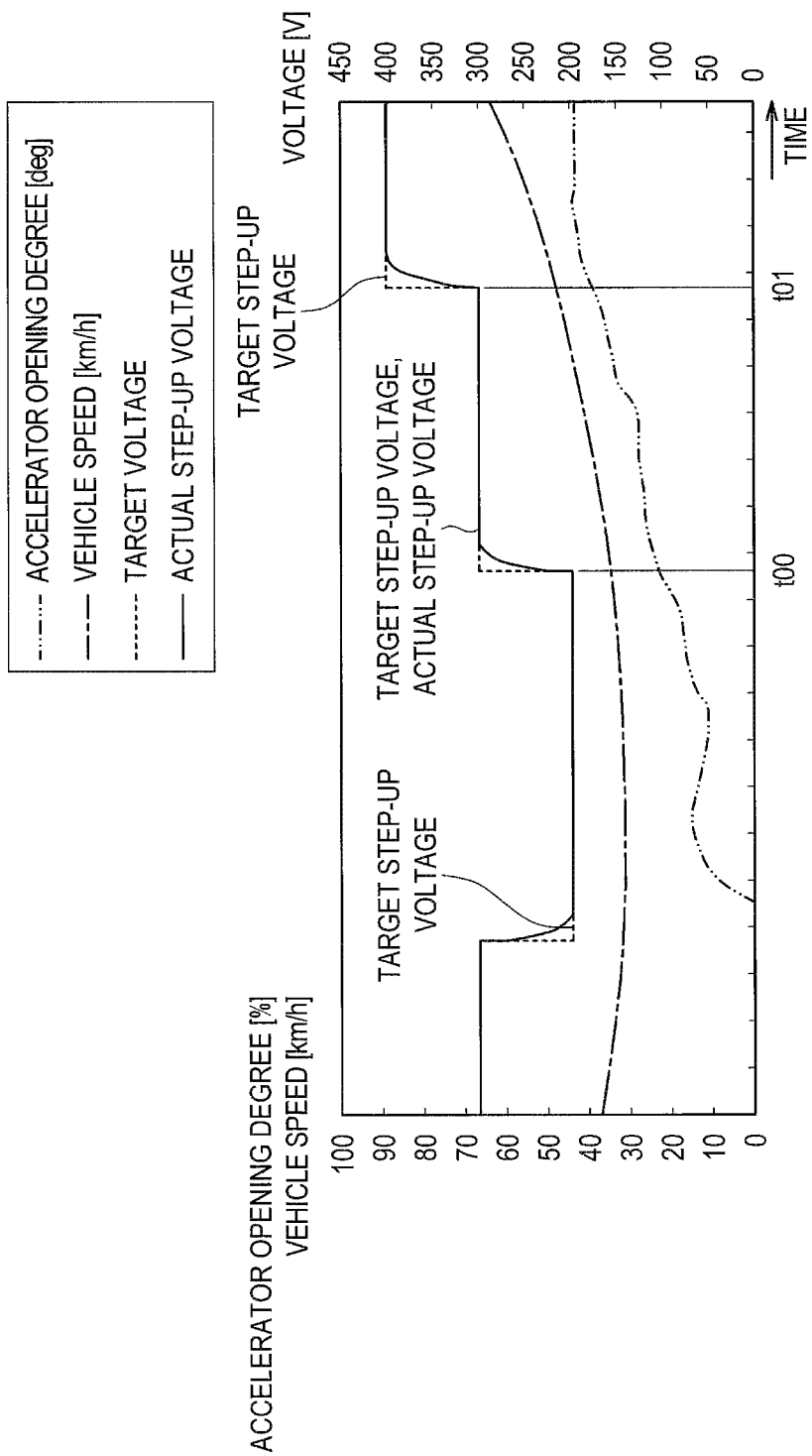
FIG. 16 is a characteristic diagram illustrating a required driving force (an accelerator opening degree) of a driver and a response characteristic of a step-up converter.

FIG. 16 is a characteristic diagram illustrating required driving forces (accelerator opening degrees) of a driver and a response characteristic of the step-up converter. FIG. 16 illustrates that a target voltage for step-up by the step-up converter 3600 (target step-up voltage) increases according to an increase of an output (a required driving forcexa vehicle speed), and a step-up voltage that is actually applied to the inverter 3700 (actual step-up voltage) increases according to the target voltage. The vertical axis on the left of FIG. 16 represents an accelerator opening degree [%] and a vehicle speed [km/h], and the vertical axis on the right represents voltage [V]. In addition, the horizontal axis of FIG. 16 represents time.

As illustrated in FIG. 16, the target step-up voltage of the step-up converter 3600 at the time t00 increases in the form of a step according to the increase of the output. In addition, the target step-up voltage of the step-up converter 3600 at the time t01 also increases in the form of a step according to a further increase of the output. On the other hand, the actual step-up voltage applied to the inverter 3700 shows a delay in time with respect to the target step-up voltage. Thus, when acceleration is performed for passing, it is necessary to improve drivability, avoiding lagging acceleration caused by the delay in time of the actual step-up voltage.

The controller 3400 predicts that the subject vehicle will pass a preceding vehicle using the environment information obtained from the controller 3200. Then, the controller 3400 controls a voltage of the step-up converter 3600 or driving based on the predicted passing operation, in addition to a required driving force that the driver requires. Thus, when the subject vehicle is predicted not to pass the preceding vehicle, the step-up ratio of the step-up converter 3600 is lowered, and thereby a loss of the step-up converter 3600 can be suppressed to a minimum. In addition, when the subject vehicle is predicted to pass the preceding vehicle, the step-up ratio can be raised before the driver depresses the acceleration pedal. Accordingly, the step-up ratio can be raised before passing, and thus lagging acceleration that occurs when the step-up ratio is raised after depression of the acceleration pedal at the time of passing can be reliably suppressed.

A passing operation can be reliably detected during an acceleration operation by the driver by detecting passing using the image information of the stereo camera assembly 3100, and thus a desired driving force can be output. In addition, a passing operation can be reliably detected even when there is no blinker operation by detecting passing using the image information of the stereo camera assembly 3100. Furthermore, a passing operation can be reliably detected even when a lane change is performed during driving along a curve by detecting passing using the image information of the stereo camera assembly 3100.

Furthermore, in the present implementation, a deviation of the subject vehicle from a driving lane and completion of a lane change to an adjacent lane are detected based on the image information of the stereo camera assembly 3100, and thus erroneous recognition of a passing operation made when a blinker is erroneously operated, or when a steering angle changes according to a curve of a road can be reliably suppressed, and step-up control of the step-up converter 3600 caused by such erroneous recognition can be reliably suppressed. In addition, the image information of the stereo camera assembly 3100 enables the preceding vehicle in the lane in which the subject vehicle travels and a preceding vehicle traveling in an adjacent lane to be detected, and thus when there is a preceding vehicle in an adjacent lane, the driver can be determined to have no intention to pass, and thus performing unnecessary step-up can be reliably suppressed.

In order to realize the control described above, the controller 3400 has an environment information acquisition module 3400a, a driving state forecast module 3400b, and a voltage control module 3400c. The voltage control module 3400c serves as the step-up control module of the appended claims in the present implementation. The environment information acquisition module 3400a acquires environment information of the outside of the vehicle from the controller 3200. The driving state forecast module 3400b forecasts whether or not the vehicle will change lanes and perform acceleration for passing based on the environment information of the outside of the vehicle. The voltage control module 3400c controls step-up by the step-up converter 3600 when acceleration for passing is forecast. The voltage control module 3400c can control step-up by the step-up converter 3600 based on a voltage margin according to a vehicle speed or a required driving force of the driver. In addition, the environment information acquisition module 3400a can also acquire information acquired by the blinker SW 3260 and the inhibitor SW 3280 as environment information. The environment information acquisition module 3400a may also acquire information relating to driving of a preceding vehicle or information of infrastructure such as a traffic light as environment information through inter-vehicle communication or an intelligent transport system (ITS).

The step-up converter 3600 steps up a voltage of the high-voltage battery 3500 based on a step-up command from the controller 3400, and applies the stepped up voltage to the inverter 3700. The inverter 3700 uses the voltage stepped up by the step-up converter 3600 to convert the voltage from DC to AC and then to apply the converted voltage to the driving motor 3800, and thereby causes a current to flow in a motor winding of the driving motor 3800. The driving motor 3800 generates a driving force for moving the vehicle using an electromagnetic force generated by the current being caused to flow on the motor wiring by the inverter 3700 and a magnetic force of a magnet mounted inside the driving motor 3800.

According to the system 3000 of the present implementation configured as described above, the controller 3400 determines whether or not the subject vehicle will pass a preceding vehicle based on the environment information received from the controller 3200, and decides a step-up voltage of the step-up converter 3600 based on the determination result.

Thus, when passing of the preceding vehicle is predicted, the step-up ratio of the step-up converter 3600 is raised before acceleration for passing is performed, and thereby drivability can be improved without causing lagging acceleration.

In addition, when no passing is predicted, the step-up ratio of the step-up converter 3600 is multiplied by one so that step-up is not performed, and thus a loss of the step-up converter 3600 can be reliably suppressed.

Figure 17:
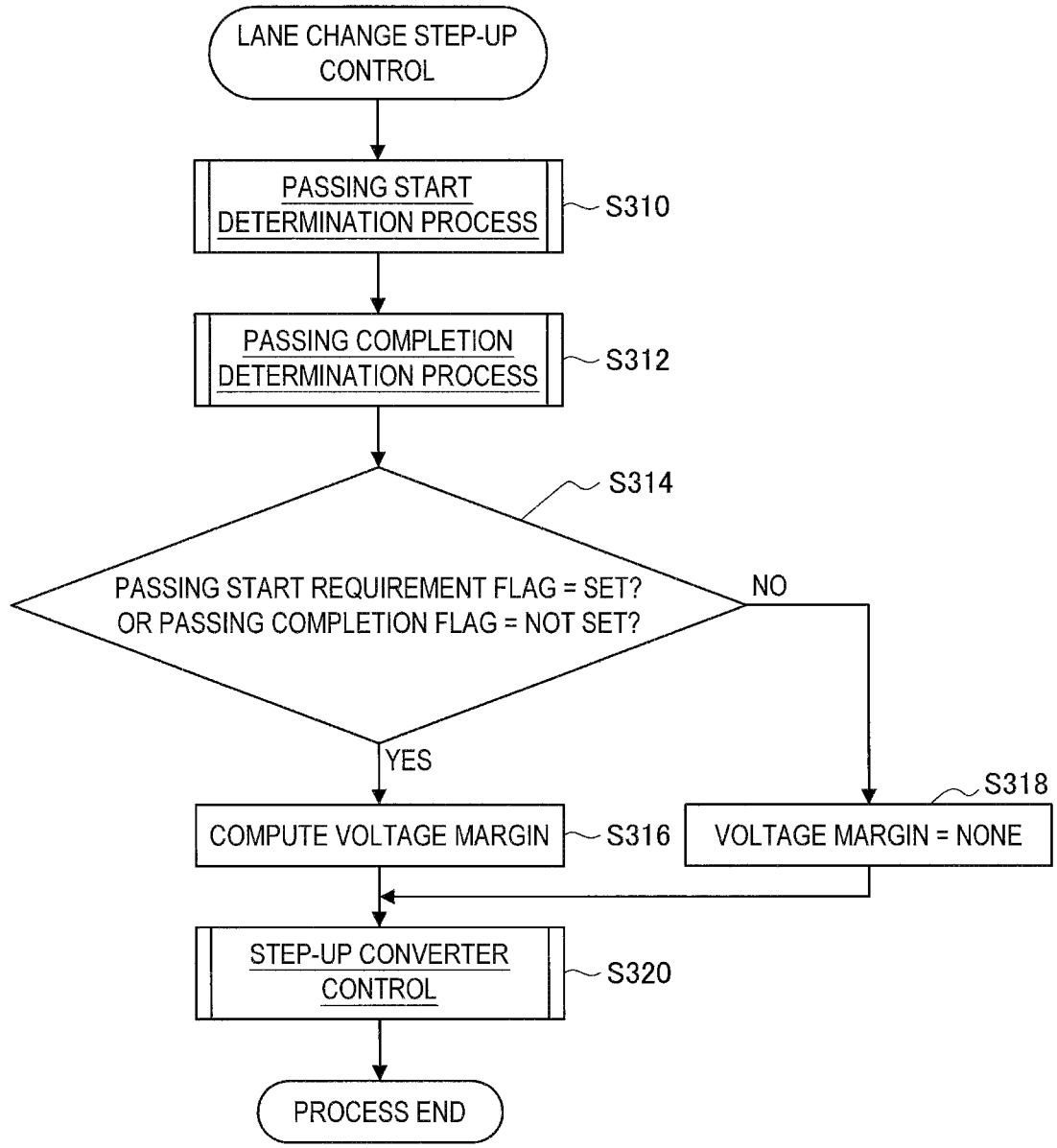
FIG. 17 is a flowchart illustrating a process of the implementation.

Next, an example of the flow of a process performed in the system of FIG. 15 will be described. FIG. 17 is a flowchart illustrating the process of the present implementation. The process of FIG. 17 is performed mainly in the controller 3400 at each predetermined control cycle (for example, about 1 ms to 10 ms). First, in Step S310, a passing start determination process is performed based on environment information obtained from the controller 3200 through cooperative control with the stereo camera assembly 3100. Here, it is determined whether or not the following conditions C1, C2, and C3 are satisfied, and when all the conditions C1, C2, and C3 are satisfied, the driver is determined to perform acceleration for passing for a lane change, and F1 described below is executed. In other cases, F2 described below is executed.

C1) The controller 3200 has detected a deviation of the subject vehicle from the lane. Note that it can be detected whether or not the subject vehicle has deviated from the lane using the fact that the subject vehicle is crossing a white line of its driving lane, or that the distance between the subject vehicle and a white line of the lane is shorter than or equal to a predetermined value based on environment information obtained from an image analysis result.

Note that it can be detected whether or not the subject vehicle has deviated from the lane using the fact that the blinker SW 3260 is turned on (ON) and the steering angle>±α [deg] is satisfied, without using image information. Herein, a is set to be a predetermined value.

C2) No preceding vehicle is in the adjacent lane that is the deviation destination, or the preceding vehicle in the adjacent lane that is the deviation destination is separated a predetermined distance or further.

C3) The inter-vehicle distance with the preceding vehicle ahead in the lane in which the subject vehicle travels is less than a predetermined value.

F1) Passing start requirement flag=set
F2) Passing start requirement flag=not set When all the conditions C1, C2, and C3 described above are satisfied, F1 described above is executed, and the passing start requirement flag is set.

In next Step S312, a passing completion determination process is performed based on the environment information obtained from the controller 3200, the vehicle speed of the subject vehicle, and the like through cooperative control with the stereo camera assembly 3100. Here, it is determined whether or not the following conditions C4 to C8 are satisfied. Then, when the condition C4 is satisfied and any one of the conditions C5 to C8 is satisfied, the driver is regarded as having completed acceleration for passing, and then F3 is executed. F4 is executed in other cases.

C4) The controller 3200 has detected that the subject vehicle is traveling in its lane (has detected that the subject vehicle has not deviated from the lane in which it had been driving).
C5) The inter-vehicle distance with the preceding vehicle is equal to or greater than a predetermined value.
C6) The vehicle speed is less than a predetermined value.
C7) The inhibitor SW (a switch that detects a shift position of automatic transmission) is positioned in a range other than the D range (for example, P (Parking) range, N (Neutral) range, or the like).
C8) The state in which the required driving force is not increasing and the passing completion flag is not set has continued for a predetermined time.
F3) Passing completion flag=set
F4) Passing completion flag=not set In next Step S314, it is determined whether or not the passing start requirement flag=set or passing completion flag=not set. Then, when either condition of the passing start requirement flag=set and passing completion flag=not set is satisfied, the process proceeds to Step S316. In Step S316, a process of computing a voltage margin is performed.

On the other hand, when neither condition of the passing start requirement flag=set and passing completion flag=not set is satisfied in Step S314, the process proceeds to Step S318. In Step S318, the voltage margin is set to 0 V.

After Steps S316 and S318, the process proceeds to Step S320. In Step S320, the step-up converter 3600 is controlled based on the voltage margin computed or set in Step S316 or S318.

As described above, according to the process of FIG. 17, when either condition of the passing start requirement flag=set and passing completion flag=not set is satisfied, passing of the preceding vehicle is predicted to be performed or to not yet have been completed, and thus the voltage margin is computed and the step-up converter 3600 is controlled according to the voltage margin. Thereby, step-up by the step-up converter 3600 can be performed before acceleration for passing, and lagging acceleration at the time of passing can be reliably repressed. In addition, when neither condition of the passing start requirement flag=set and passing completion flag=not set is satisfied, passing of the preceding vehicle is predicted not to be performed or to have been completed, and thus the voltage margin is set to 0 V. Thus, a loss of the step-up converter 3600 can be reliably suppressed.

Note that, in the above description, it is forecast whether or not acceleration for passing will be performed based on the environment information obtained by analyzing the image information from the stereo camera assembly 3100; however, information relating to travel of a preceding vehicle or information of infrastructure such as a traffic light can be acquired through inter-vehicle communication or an intelligent transport system (ITS), and it can be forecast whether or not acceleration for passing will be performed based on the acquired information.

Next, the process of controlling the step-up converter 3600 in Step S320 of FIG. 17 will be described based on FIG. 18. First, in Step S330, a process of computing a target step-up voltage is performed. Note that a "target step-up voltage" refers to a target value of the step-up converter 3600 to step up the voltage of the high-voltage battery 3500. As an example, the target step-up voltage is set to about 200 V to 650 V as illustrated in FIG. 3. "Necessary step-up voltage" refers to a minimum step-up voltage necessary for outputting a required driving force of a driver, and "actual step-up voltage" refers to a voltage that the step-up converter 3600 actually outputs. In addition, "maximum step-up voltage" refers to a voltage that the step-up converter 3600 can step up to a maximum, and the maximum step-up voltage in the example of FIG. 3 is 650 V. In the present implementation, the target step-up voltage is set to a value obtained by adding a voltage margin to the necessary step-up voltage, and computed from the following formula.

Target step-up voltage=Necessary step-up voltage+ Voltage margin

The voltage margin is normally set to "0," and when acceleration for passing is performed, it is set based on a voltage margin map to be described later. The target step-up voltage is normally not set to a value greater than the maximum step-up voltage.

When the actual step-up voltage falls below the necessary step-up voltage, it is not possible to output a target driving force. In addition, the actual step-up voltage is controlled to be substantially the same value as the target step-up voltage; however, when the necessary step-up voltage is not secured, there are cases in which the actual step-up voltage shows a response delay with respect to the target step-up voltage.

In the present implementation, by setting the target step-up voltage by adding a voltage margin to the minimum necessary step-up voltage for outputting a required driving force of the driver, maximum acceleration performance can be demonstrated when a vehicle changes lanes and performs acceleration for passing. Note that the voltage margin computation method will be described later in detail.

In next Step S332, it is determined whether or not the target step-up voltage computed in Step S330 exceeds the maximum step-up voltage. Then, when the target step-up voltage exceeds the maximum step-up voltage, the process proceeds to Step S334. In Step S334, the target step-up voltage is set as the maximum step-up voltage. After Step S334, the process proceeds to Step S336. On the other hand, when the target step-up voltage does not exceed the maximum step-up voltage in Step S332, the process proceeds from Step S332 to Step S336.

In Step S336, it is determined whether or not the target step-up voltage exceeds the voltage of the high-voltage battery 3500. Then, when the target step-up voltage exceeds the voltage of the high-voltage battery 3500, the process proceeds to Step S338. In Step S338, the step-up converter 3600 starts to be driven in order to step up the voltage of the high-voltage battery 3500. Accordingly, the actual step-up voltage of the step-up converter 3600 is controlled to become the target step-up voltage.

On the other hand, when the target step-up voltage does not exceed the voltage of the high-voltage battery 3500 in Step S336, the process proceeds to Step S340. In Step S340, driving of the step-up converter 3600 stops. Accordingly, step-up by the step-up converter 3600 is not performed (step-up ratio=1), and the voltage of the high-voltage battery 3500 is applied to the inverter 3700.

As described above, in the present implementation, the target step-up voltage is set by adding the voltage margin to the minimum necessary step-up voltage for outputting a required driving force of the driver. Then, by controlling the actual step-up voltage of the step-up converter 3600 to become the target step-up voltage, maximum acceleration performance can be demonstrated when the vehicle changes lanes and performs acceleration for passing.

Figure 18:
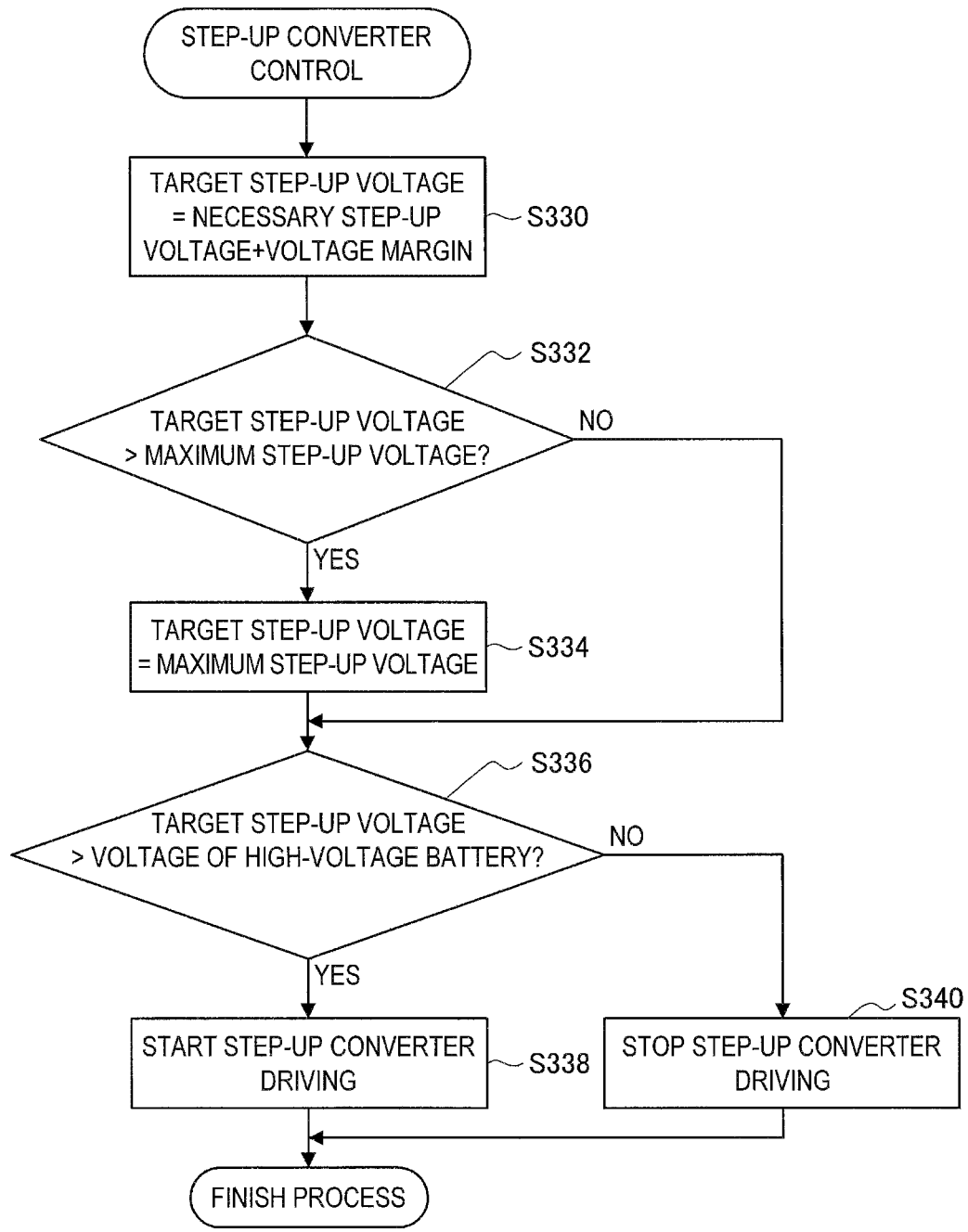
FIG. 18 is a flowchart illustrating a process of controlling a step-up converter.
Figure 19:
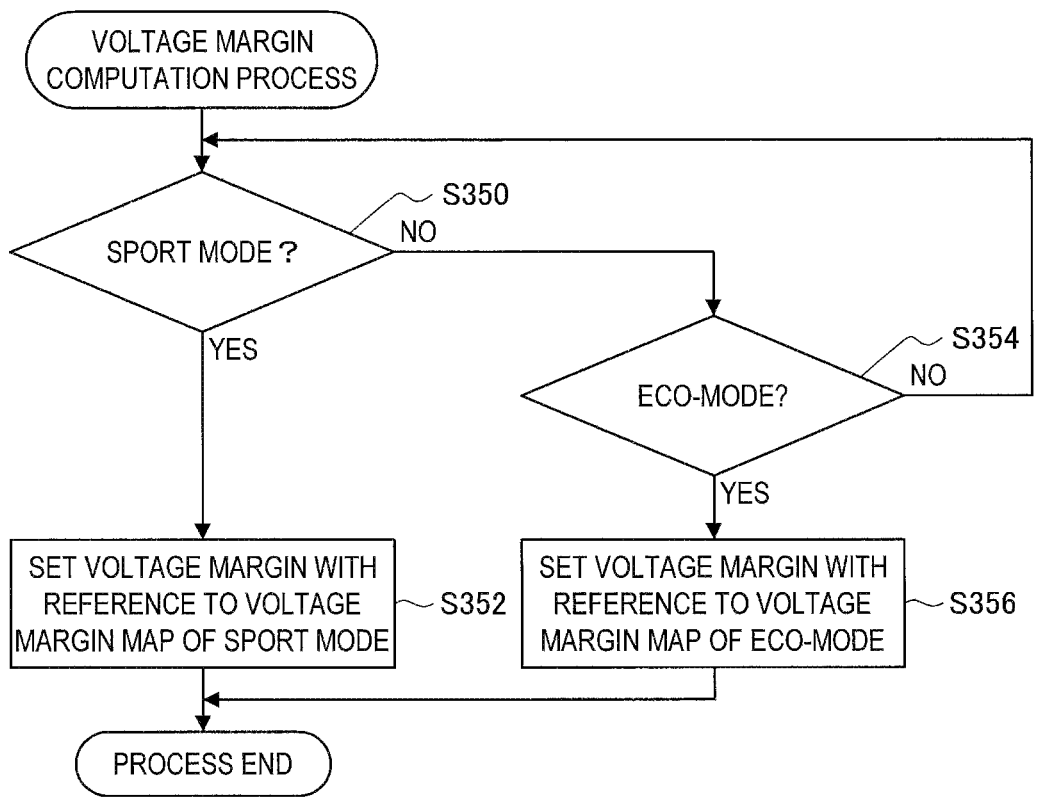
FIG. 19 is a flowchart illustrating a process of computing a voltage margin that is used in Step S330 of FIG. 18.

FIG. 19 is a flowchart illustrating the process of computing the voltage margin that is used in Step S330 of FIG. 18. In the present implementation, the voltage margin is controlled to vary according to driving modes. Here, as the driving modes, a sport mode and an eco-mode are exemplified. The sport mode is a mode that puts stress on acceleration performance in which there is no limit on a change rate of a required driving force when a driver depresses the acceleration pedal 3300. On the other hand, the eco-mode is a mode that puts stress on fuel efficiency performance in which acceleration performance is suppressed and fuel efficiency performance is improved by setting a change rate of a required driving force when a driver depresses the acceleration pedal 3300 to be a predetermined value or lower.

First, in Step S350, it is determined whether or not the sport mode has been set. When the sport mode has been set, the process proceeds to Step S352. In Step S352, a voltage margin map of the sport mode is referred to in order to set a voltage margin.

On the other hand, when the sport mode is determined not to have been set in Step S350, the process proceeds to Step S354. In Step S354, it is determined whether or not the eco-mode has been set, and in the case of the eco-mode, the process proceeds to Step S356. In Step S356, a voltage margin map of the eco-mode is referred to in order to set a voltage margin. After Steps S352 and S356, the process ends. Note that when the eco-mode is determined not to have been set in Step S354, the process returns to Step S350.

Figure 20:
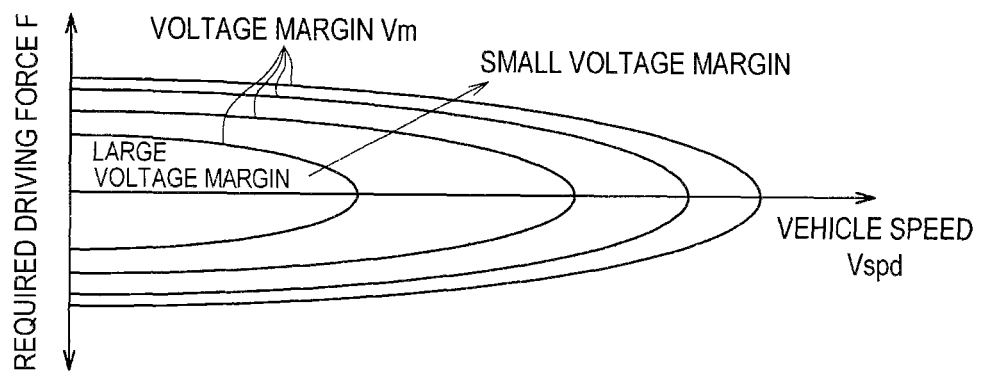
FIG. 20 is a schematic diagram illustrating an overview of a voltage margin map.

FIG. 20 is a schematic diagram illustrating an overview of a voltage margin map. As illustrated in FIG. 20, a voltage margin Vm is set to be smaller as a vehicle speed Vspd becomes higher. In addition, the voltage margin Vm is set to be smaller as the absolute value of a required driving force F becomes greater. The voltage margin map illustrated in FIG. 20 is set for each driving mode such as the sport mode and the eco-mode. Note that, on the map of FIG. 20, when a required driving force is a negative value, the map corresponds to a map of regeneration.

Figure 21:
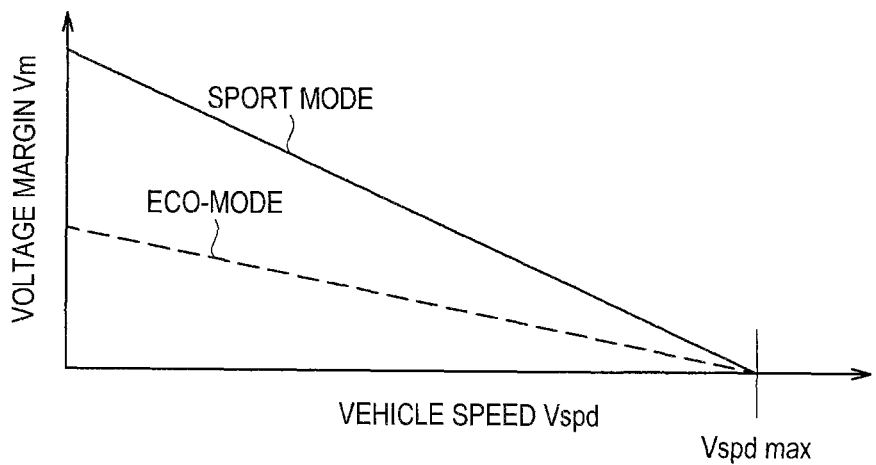
FIG. 21 is a schematic diagram illustrating the voltage margin map of FIG. 20 in more detail.
Figure 22:
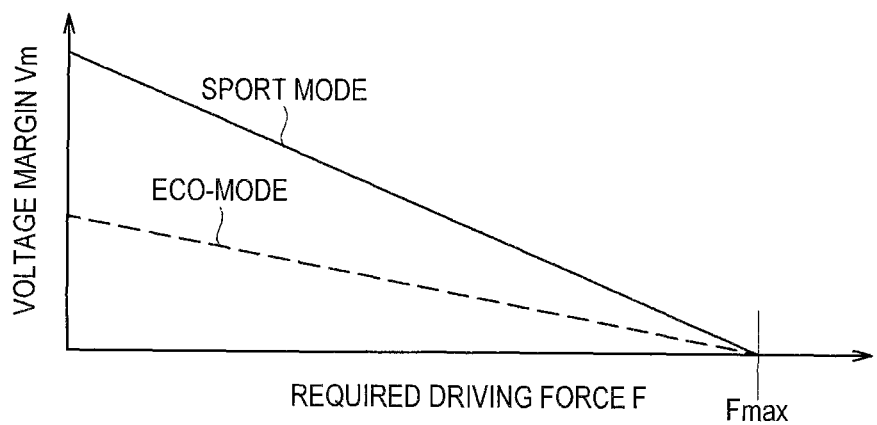
FIG. 22 is another schematic diagram illustrating the voltage margin map of FIG. 20 in more detail.

FIGS. 21 and 22 are schematic diagrams illustrating the voltage margin map of FIG. 20 in more detail. In FIGS. 21 and 22, the voltage margin map of FIG. 20 is divided into a map according to vehicle speeds Vspd and a map according to required driving forces F. In addition, FIGS. 21 and 22 illustrate maps in the sport mode and the eco-mode.

FIG. 21 is a schematic diagram illustrating the map of the voltage margins Vm according to vehicle speeds Vspd. As the vehicle speed Vspd becomes lower, the difference between the speed after acceleration and the speed before acceleration is expected to be greater, and thus the increase amount of the speed at the time of acceleration is assumed to be large. Thus, as illustrated in FIG. 21, as the vehicle speed Vspd becomes lower, the voltage margin is set to be greater in expectation of maximum acceleration. In addition, in the eco-mode, there is a limit on acceleration performance in order to suppress energy consumption; however, in the sport mode, acceleration performance is limited to a minimum level. For this reason, the voltage margin Vm is set to be greater in the sport mode than in the eco-mode as illustrated in FIG. 21. In this way, when acceleration for passing is forecast according to a lane change, a voltage is set taking a maximum change rate of a required driving force into account.

FIG. 22 is a schematic diagram illustrating the map of the voltage margins Vm according to required driving forces F. As the required driving force F before acceleration is smaller, the difference between the required driving force F before acceleration and the required driving force F after acceleration is expected to be greater, and thus the change rate of the required driving force at the time of acceleration is assumed to be high. Thus, in order to be prepared for a greater change in a required driving force, the voltage margin is set to increase as the required driving force F before acceleration is smaller as illustrated in FIG. 22. In addition, in the eco-mode, there is a limit on the change rate of the required driving force F at the time of acceleration in order to suppress energy consumption; however, in the sport mode, the change rate of the required driving force at the time of acceleration is limited to a minimum level. For this reason, the voltage margin Vm is set to be greater in the sport mode than in the eco-mode as illustrated in FIG. 22.

Thus, in Steps S352 and S356 of FIG. 19, the voltage margins Vm are set with reference to the voltage margin map of FIG. 20 (FIGS. 21 and 22).

Next, step-up control at the time of a lane change according to the present implementation will be described in a time series manner based on FIGS. 23 to 25. Note that a "target driving force" is a value corresponding to a required driving force by a driver, and a required driving force is a driving force required by a driver through an acceleration operation, and is decided based on an operation amount of the acceleration pedal 3300. When cruise control is performed, "target driving force" may be a value designated through the cruise control. "Actual driving force" refers to a driving force that the driving motor 3800 actually generates. The "actual driving force" is output without a response delay as long as a necessary step-up voltage is secured.

Figure 23:
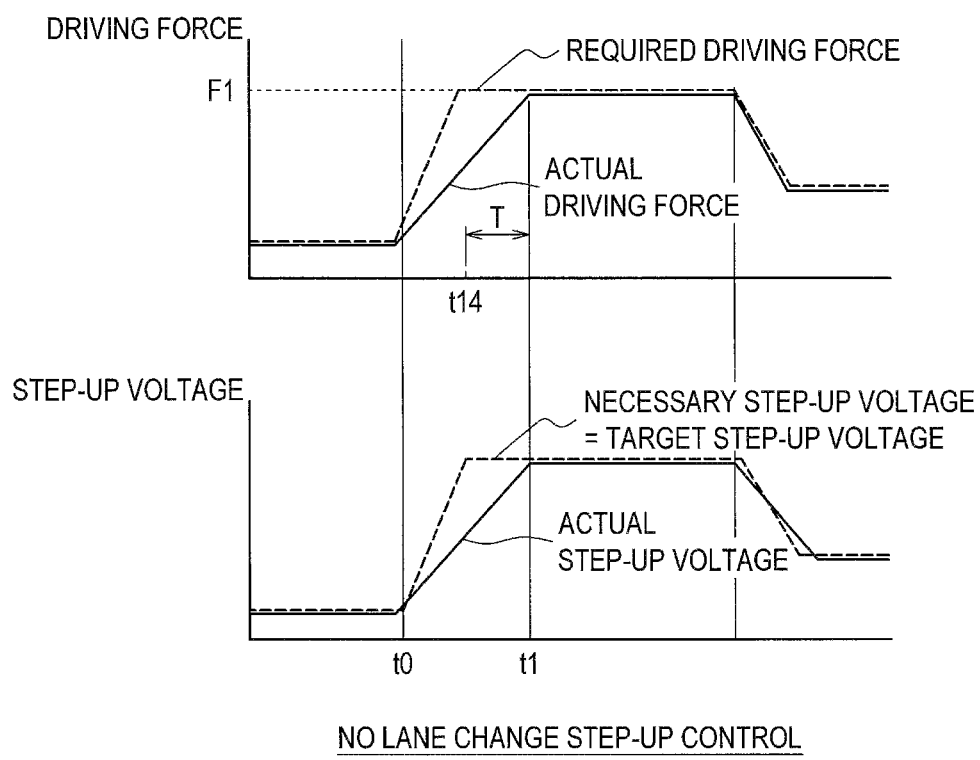
FIG. 23 is a schematic diagram illustrating control performed when step-up control at the time of a lane change is not performed according to the implementation for comparison.

First, FIG. 23 is a schematic diagram illustrating control performed when step-up control at the time of a lane change is not performed according to the present implementation for comparison. In FIG. 23, the upper graph illustrates the characteristic of changes in driving forces (required driving force and actual driving force), and the lower graph illustrates the characteristic of changes in step-up voltages (target step-up voltage, necessary step-up voltage, and actual step-up voltage). Note that, in FIG. 23, the target step-up voltage is equal to the necessary step-up voltage because a voltage margin is not set.

As illustrated in FIG. 23, acceleration starts at the time t0 at which a driver depresses the acceleration pedal to change lanes, and thus the required driving force (dashed line) increases. The necessary step-up voltage (dashed line) is a value according to the required driving force, and thus, the necessary step-up voltage also increases according to the increase of the required driving force from the time t0. However, even though the necessary step-up voltage is stepped up from the time t0, the actual step-up voltage (solid line) increases more slowly than the necessary step-up voltage. For this reason, the actual step-up voltage is lower than the necessary step-up voltage, and the actual driving force (solid line) corresponding to the actual step-up voltage is smaller than the required driving force. Thus, it is not possible to output the actual driving force according to the required driving force. The actual step-up voltage reaches the necessary step-up voltage at the time t1 or later, and thus the actual driving force corresponding to the required driving force can be output; however, because the actual driving force is smaller than the required driving force between the times t0 to t1, it is not possible to demonstrate the required driving force of the driver, and lagging acceleration occurs.

Figure 24:
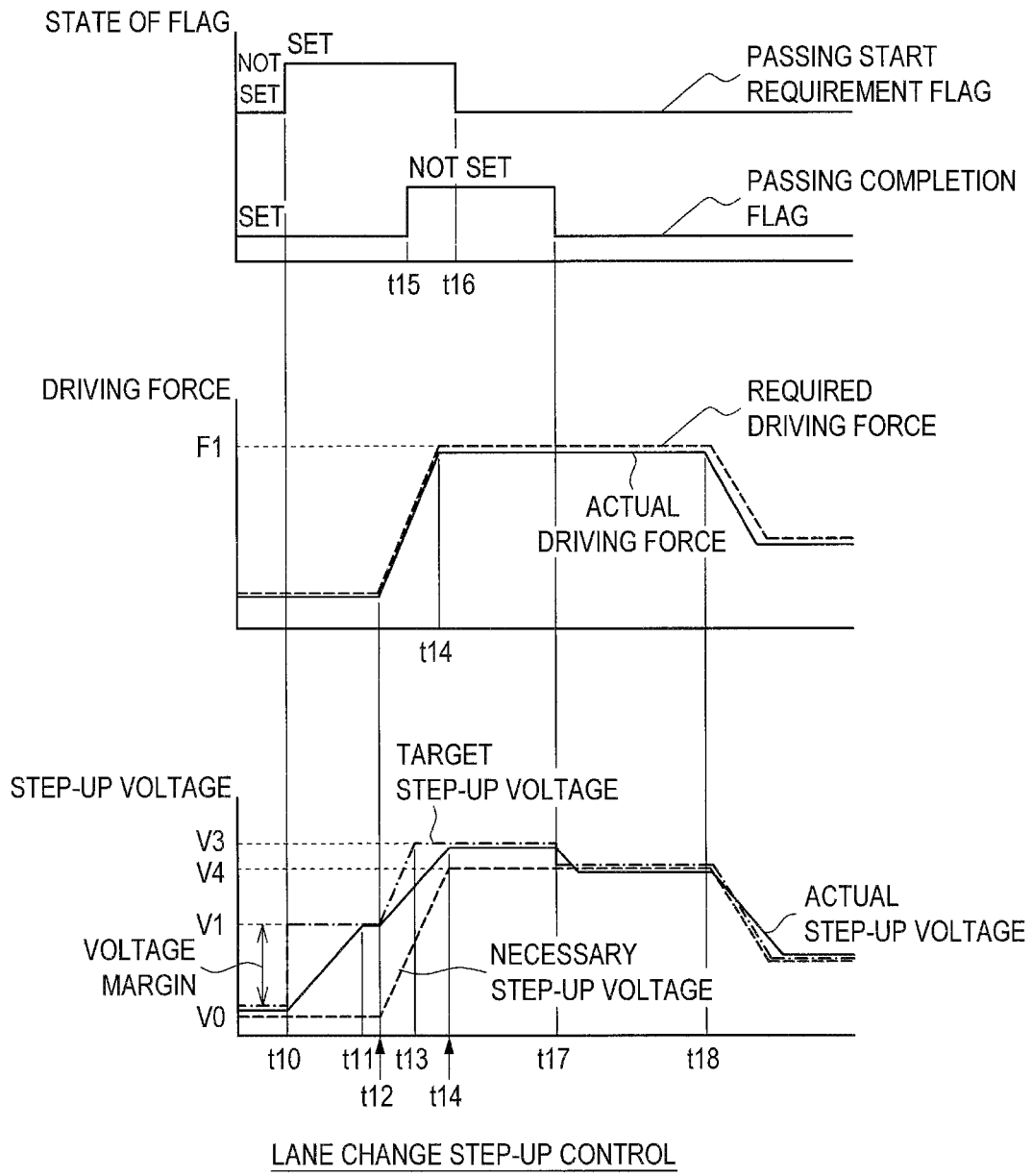
FIG. 24 is a schematic diagram illustrating step-up control performed for a lane change according to the implementation.

FIG. 24 is a schematic diagram illustrating step-up control performed for a lane change according to the present implementation. FIG. 24 illustrates a situation in which there is a limit on the change rate of a required driving force such as in the eco-mode. In FIG. 24, the upper graph illustrates the characteristic of states of the passing start requirement flag and of the passing completion flag. In addition, the middle graph illustrates the characteristic of changes in driving forces (required driving force and actual driving force), and the lower graph illustrates the characteristic of changes in step-up voltages (target step-up voltage, necessary step-up voltage, and actual step-up voltage). As described above, a target step-up voltage is a value obtained by adding a voltage margin to a necessary step-up voltage.

First, when the passing start requirement flag transitions from "not set" to "set" at the time t10, a start of passing for a lane change is detected, and thus a voltage margin is computed (Step S316 of FIG. 17), and the step-up converter 3600 is controlled (Step S320 of FIG. 17). Accordingly, the voltage margin is added to the target step-up voltage (dashed-dotted line), and the target step-up voltage increases from V0 to V1. When the target step-up voltage increases to V1 at the time t10, the actual step-up voltage (solid line) starts increasing from V0. Here, the section from V1 to V0 is the voltage margin. The voltage margin is computed from the map of FIG. 20 (FIGS. 21 and 22). FIG. 24 illustrates the case in which there is a limit on the change rate of the required driving force, and thus, the voltage margin is computed from the map of the eco-mode.

The actual step-up voltage reaches V1 at the time t11, being equal to the target step-up voltage. Next, when the driver depresses the acceleration pedal at the time t12, the required driving force (dashed line) increases. At this moment, there is a limit on the change rate of the required driving force, and thus, the required driving force increases from the time t12 having the slope illustrated in the middle graph of FIG. 24 as time elapses.

Then, the necessary step-up voltage (dashed line) increases according to the increase of the required driving force. At this moment, the actual step-up voltage of the step-up converter 3600 has increased to V1 and the actual step-up voltage exceeds the necessary step-up voltage (actual step-up voltage necessary step-up voltage) at the time t12, and thus the actual driving force (solid line) can be output without a delay for the required driving force. Therefore, as illustrated in the middle graph of FIG. 24, the actual driving force is output without a delay for the required driving force, and accordingly lagging acceleration does not occur.

In addition, when the required driving force starts increasing at the time t12, the target step-up voltage increases according to the increase of the required driving force, and the target step-up voltage reaches the maximum step-up voltage V3 (for example, 650 V) at the time t13. When the target step-up voltage increases from the time t12, the actual step-up voltage that has been V1 at the time t12 also starts increasing, and reaches the maximum step-up voltage V3 at the time t14. In this manner, the necessary step-up voltage also increases according to the increase of the required driving force from the time t12; however, the actual step-up voltage has increased in advance, and thus the actual step-up voltage is normally higher than the necessary step-up voltage. Thus, even when the required driving force increases from the time t12, the actual driving force can be output according to the necessary driving force without causing a delay for the required driving force.

When the required driving force reaches F1 at the time t14 and is maintained at F1 from the time t14, the necessary step-up voltage is also maintained at V4 that is the value according to the required driving force.

In addition, the passing completion flag transitions from "set" to "not set" at the time t15, and the passing start requirement flag transitions from "set" to "not set" at the time t16. Then, the passing completion flag transitions from "not set" to "set" at the time t17.

When the passing completion flag transitions from "not set" to "set" at the time t17, completion of passing is detected, and thus the voltage margin is set to "0" (Step S318 of FIG. 17). Thus, the target step-up voltage is equal to the necessary step-up voltage, and the target step-up voltage is lowered to V4 that is the value according to the required driving force. Accordingly, the actual step-up voltage also decreases to V4. Then, when the required driving force decreases at the time t18, the target step-up voltage (necessary step-up voltage) also decreases according to the decrease of the required driving force. Accordingly, the actual step-up voltage decreases, and thereby a loss of the step-up converter 3600 can be suppressed to a minimum.

As described above, by performing step-up control for a lane change according to the present implementation, the target step-up voltage can be raised by the voltage margin from the necessary step-up voltage at the time t10 that is before the required driving force for a lane change increases. In addition, the actual step-up voltage can be raised to the target step-up voltage before the required driving force increases, and thus, the actual driving force can be output according to the required driving force. Accordingly, lagging acceleration at the time of a lane change can be reliably suppressed.

In addition, by raising the target step-up voltage according to the required driving force while the required driving force increases, the voltage margin of the target step-up voltage can be secured for the necessary step-up voltage increasing according to the increase of the required driving force. Accordingly, even while the required driving force increases, the actual driving force can be output according to the required driving force without delay.

FIG. 23 illustrates the time t14 at which the actual driving force of FIG. 24 reaches F1, for comparison to FIG. 24. As illustrated in FIG. 23, the time t1 at which the actual driving force reaches F1 when there is no lane change step-up control is later than the time t14 by the time T. Thus, according to the lane change step-up control illustrated in FIG. 24, initiation of a driving force at the time of a lane change can be dramatically improved.

Figure 25:
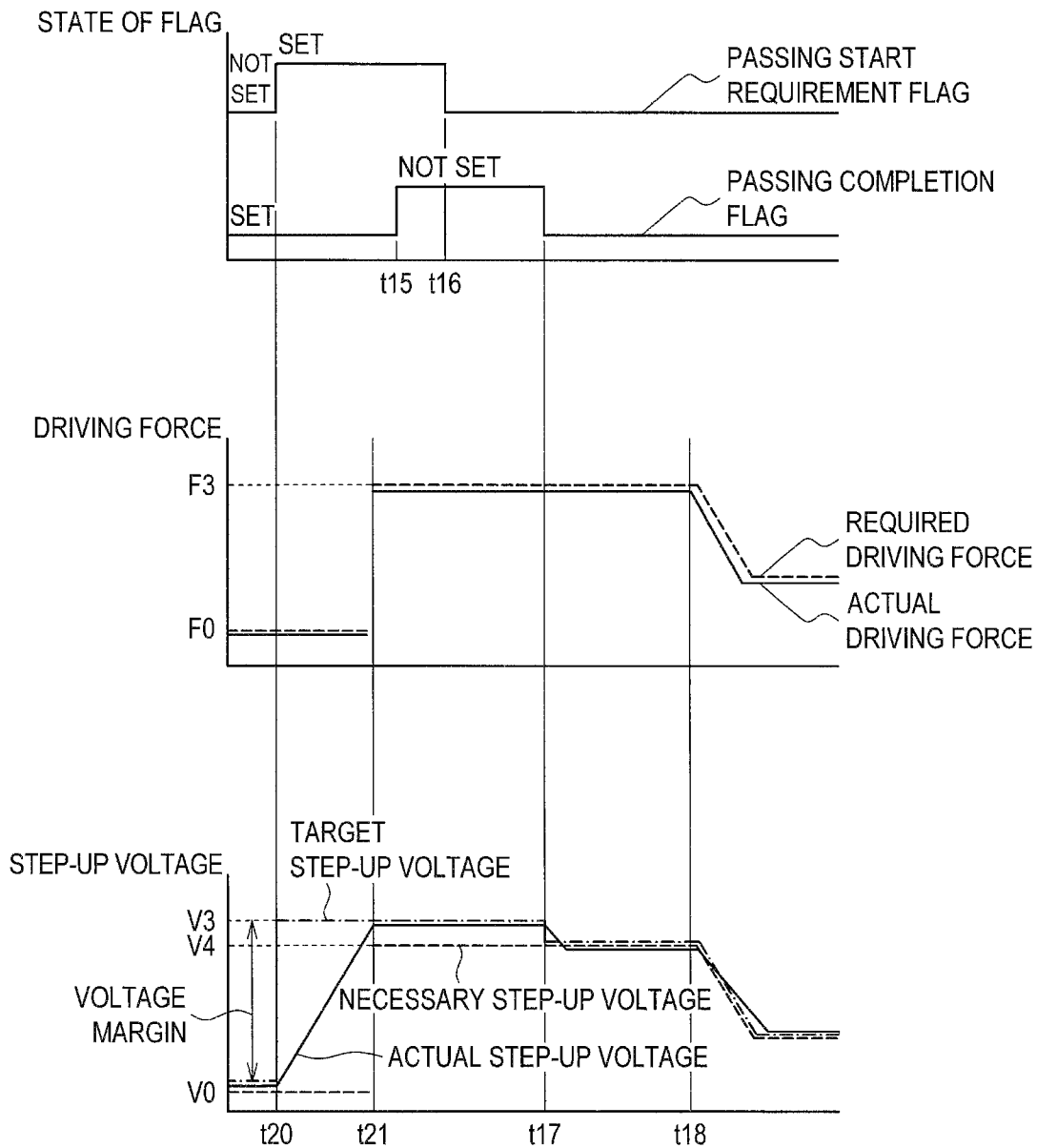
FIG. 25 is a schematic diagram illustrating control performed when a change rate of a required driving force is not limited.

Next, FIG. 25 is a schematic diagram illustrating control performed when a change rate of a required driving force is not limited (change rate=∞). The case in which a change rate of a required driving force is not limited corresponds to the sport mode that puts stress on acceleration performance. Like in FIG. 24, the upper graph of FIG. 25 illustrates the characteristic of states of the passing start requirement flag and the passing completion flag. In addition, the middle graph illustrates the characteristic of changes in driving forces, and the lower graph illustrates the characteristic of step-up voltages (target step-up voltage, necessary step-up voltage, and actual step-up voltage).

First, when the passing start requirement flag transitions from "not set" to "set" at the time t20, the beginning of passing is detected according to a lane change, and thus a voltage margin is computed (Step S316 of FIG. 17), and then the step-up converter 3600 is controlled (Step S320 of FIG. 17). Accordingly, the voltage margin is added to the target step-up voltage (dashed-dotted line), and thus the target step-up voltage increases from V0 to V3. When the target step-up voltage increases to the maximum step-up voltage V3 at the time t20, the actual step-up voltage (solid line) starts increasing from V0. Here, the section from V3 to V0 is the voltage margin. The voltage margin is computed from the map of FIG. 20 (FIGS. 21 and 22). No limit is set on the change rate of the required driving force in FIG. 25, and thus, the voltage margin is computed from the map of the sport mode.

At the time t21, the actual step-up voltage reaches the maximum step-up voltage V3, being equal to the target step-up voltage. Next, when the driver depresses the acceleration pedal at the time t21, the required driving force (dashed line) increases. In this case, because no limit is set on the change rate of the required driving force, the required driving force increases to F3 at the time t21 in the form of a step.

In addition, the necessary step-up voltage (dashed line) increases according to the increase of the required driving force. The necessary step-up voltage increases from V0 to V4 at the time t21 in the form of a step according to the step-like increase of the required driving force. At this moment, the actual step-up voltage of the step-up converter 3600 has increased to the maximum step-up voltage V3, exceeding the necessary step-up voltage at the time t21 (actual step-up voltage necessary step-up voltage), and thus, even though the required driving force instantly increases to F3 at the time t21, the actual driving force (solid line) can be output without a delay for the required driving force. Therefore, as illustrated in the middle graph of FIG. 25, the actual driving force is output without a delay for the required driving force, and thus lagging acceleration does not occur.

When the required driving force reaches F3 at the time t21 and is maintained at F3 from the time t21, the necessary step-up voltage is also maintained at V4 that is the value according to the required driving force. Processes performed thereafter are the same as in FIG. 24.

In the present implementation, the voltage margin is set according to the change rate of the required driving force. When the sport mode is set, acceleration performance is considered important, and thus the change rate of the required driving force is set to be higher than in the eco-mode. For this reason, the voltage margin is set to be higher in the sport mode than in the eco-mode in order to demonstrate acceleration performance. Accordingly, when the sport mode is set, the voltage margin (=V3 to V0) is secured to be maximum and the target step-up voltage is raised to the maximum step-up voltage V3 as illustrated in FIG. 25, and thus, even when the required driving force sharply increases, the actual driving force can be output without a delay for the required driving force. Therefore, desired acceleration can be realized in the sport mode in which acceleration performance is considered important, without causing acceleration performance to deteriorate.

According to the third implementation described above, when acceleration for passing is forecast, the step-up converter 3600 steps up a voltage by a voltage margin set according to a vehicle speed or a required driving force. Thus, when acceleration for passing is performed, lagging acceleration can be reliably suppressed. In addition, the voltage can be stepped up by a necessary voltage margin by performing step-up for a voltage margin set according to the vehicle speed or the required driving force. Accordingly, step-up can be controlled optimally, and a loss occurring in step-up can be suppressed to a minimum. Therefore, according to the present implementation, when acceleration for passing is predicted, a loss in step-up can be suppressed to a minimum by performing the step-up while optically controlling a voltage margin necessary for the acceleration for passing.

Although the configurations of the stereo camera assembly 3100 and the controller (image processing-ECU) 3200, for example, have been described as outside-of-vehicle monitoring modules in the implementations described above, the present disclosure is not limited thereto. A deviation from a driving lane may be determined using a monocular camera rather than a stereo camera assembly. In addition, information of the inter-vehicle distance with a preceding vehicle or the like may be acquired using radar or the like rather than image information. Moreover, the information of the inter-vehicle distance with a preceding vehicle or the like may be acquired using a configuration in which a camera and radar are combined.

Although the preferred examples of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) A battery voltage control device including:
a step-up module that steps up a voltage of a battery and then applies the voltage to a driving motor;
an outside-of-vehicle monitoring module that monitors the outside of a vehicle to acquire a piece of environment information of the outside of the vehicle;
a driving state forecast module that forecasts a driving state including starting or stopping of the vehicle based on the environment information of the outside of the vehicle; and a voltage control module that controls step-up by the step-up module based on the forecast driving state.

(2) The battery voltage control device according to (1), in which the outside-of-vehicle monitoring module has an image analysis processing module that acquires and analyzes a piece of image information of the outside of the vehicle obtained through imaging, and acquires the piece of environment information based on the piece of image information.

(3) The battery voltage control device according to (2), in which the image analysis processing module acquires the image information from a stereo camera assembly.

(4) The battery voltage control device according to (1), in which the driving state forecast module forecasts starting or stopping of the vehicle based on the piece of environment information that indicates a lighting state of a traffic signal ahead of the vehicle.

(5) The battery voltage control device according to (1), in which the driving state forecast module forecasts starting or stopping of the vehicle based on the piece of environment information that indicates a lighting state of a brake lamp of a preceding vehicle ahead of the vehicle.

(6) The battery voltage control device according to (1), in which the driving state forecast module forecasts starting or stopping of the vehicle based on the piece of environment information that indicates an inter-vehicle distance from a preceding vehicle ahead of the vehicle.

(7) The battery voltage control device according to (1), in which the voltage control module causes the step-up module to execute step-up before start of a vehicle when the driving state forecast module forecasts starting of the vehicle while the vehicle is stopped.

(8) The battery voltage control device according to (1), in which the voltage control module does not cause the step-up module to execute step-up when the driving state forecast module forecasts stopping of the vehicle while the vehicle is traveling.

(9) A battery voltage control method including:
monitoring the outside of the vehicle and acquiring a piece of environment information of the outside of the vehicle;
forecasting a driving state including starting or stopping of the vehicle based on the piece of environment information of the outside of the vehicle; and
controlling step-up of the battery voltage by the step-up converter based on the forecast driving state.

(10) A battery voltage control device including:
a step-up module that steps up a voltage of a battery and then applies the voltage to a driving motor;
a travel mode acquisition module that acquires a travel mode that relates to an output characteristic of the driving motor;
an accelerator opening degree acquisition module that acquires an accelerator opening degree; and
a step-up control module that controls a target step-up voltage of step-up by the step-up module based on the travel mode and the accelerator opening degree.

(11) The battery voltage control device according to (10), in which the step-up control module sets the target step-up voltage to be higher than a necessary step-up voltage necessary for the driving motor to output a target driving force, and changes a margin of the target step-up voltage with respect to the necessary step-up voltage according to the travel mode.

(12) The battery voltage control device according to (10), in which the step-up control module includes a future driver-required driving force computation module that computes a future driver-required driving force based on the travel mode and the accelerator opening degree, and a target step-up voltage computation module that computes the target step-up voltage based on the future driver-required driving force.

(13) The battery voltage control device according to (12), in which the future driver-required driving force computation module computes a driver-required driving force based on a map on which a relation between an accelerator opening degree and a required driving force is defined for each of the driving modes, and computes the future driver-required driving force based on the driver-required driving force.

(14) The battery voltage control device according to (13), in which the future driver-required driving force computation module performs a limit process that is based on a threshold of a change rate of the driver-required driving force on the driver-required driving force, and computes the future driver-required driving force based on the driver-required driving force that has undergone the limit process.

(15) The battery voltage control device according to (12), in which the future driver-required driving force computation module computes the future driver-required driving force by adding an upper limit value of a change rate of the driver-required driving force to the driver-required driving force.

(16) The battery voltage control device according to (15), in which the future driver-required driving force computation module computes the future driver-required driving force by performing threshold value processing by upper and lower limit values of a required driving force at the time when the accelerator opening degree is 0% or 100% with respect to the value obtained by adding the upper limit value of the change rate of the driver-required driving force.

(17) The battery voltage control device according to (12), in which the target step-up voltage computation module computes the target step-up voltage based on a map on which the target step-up voltage is prescribed according to the future driver-required driving force and the number of rotations of the driving motor.

(18) A battery voltage control method including:
acquiring a travel mode that relates to an output characteristic of a driving motor;
acquiring an accelerator opening degree; and
controlling a target step-up voltage of step-up of a battery voltage to be applied to the driving motor based on the travel mode and the accelerator opening degree.

(19) A battery voltage control device including:
a step-up module that steps up a voltage of a battery and then applies the voltage to a driving motor;
an environment information acquisition module that acquires a piece of environment information of the outside of the vehicle;
a driving state forecast module that forecasts whether or not acceleration for passing will be performed by a lane change based on the piece of environment information; and
a voltage control module that controls step-up by the step-up module based on a voltage margin according to a vehicle speed or a driver-required driving force when the acceleration for passing is forecast to be performed.

(20) The battery voltage control device according to (19), in which the voltage control module sets a value of the voltage margin to be higher as the vehicle speed becomes lower.

(21) The battery voltage control device according to (19), in which the voltage control module sets a value of the voltage margin to be higher as the required driving force becomes smaller.

(22) The battery voltage control device according to (19), in which the voltage control module sets the voltage margin based on a voltage margin map on which the voltage margin is prescribed according to the vehicle speed or the driver-required driving force.

(23) The battery voltage control device according to (22), in which the voltage margin map prescribes the voltage margin based on the vehicle speed or the required driving force according to a driving mode.

(24) The battery voltage control device according to (23), in which the driving mode includes a sport mode and an eco-mode.

(25) The battery voltage control device according to (24), in which the voltage margin map prescribes the voltage margin so that the voltage margin is higher in the sport mode than in the eco-mode.

(26) The battery voltage control device according to (19), further including:
an image analysis processing module that acquires and analyzes a piece of image information of the outside of the vehicle that is obtained through imaging,
in which the environment information acquisition module acquires the piece of environment information from a result obtained by analyzing the piece of image information.

(27) The battery voltage control device according to (26), in which the image analysis processing module acquires the piece of image information from a stereo camera assembly.

(28) The battery voltage control device according to (26), in which the environment information acquisition module acquires the piece of environment information that indicates whether or not a subject vehicle has deviated from a driving lane from the result that the image analysis processing module obtains by analyzing the piece of image information.

(29) The battery voltage control device according to (26), in which the piece of environment information includes a positional relation between a subject vehicle and a boundary line of a lane in which the subject vehicle travels.

(30) The battery voltage control device according to (26), in which the piece of environment information includes an inter-vehicle distance between a subject vehicle and a preceding vehicle.

(31) The battery voltage control device according to (26), in which the environment information acquisition module acquires the piece of environment information that indicates whether or not the subject vehicle has deviated from a driving lane based on an operation state of a blinker and a steering angle.

(32) The battery voltage control device according to (28),
in which the environment information acquisition module further acquires the piece of environment information that relates to a preceding vehicle in an adjacent lane that is a deviation destination to which the subject vehicle deviates from the driving lane from the result that the image analysis processing module obtains by analyzing the piece of image information, and
in which the driving state forecast module forecasts that acceleration for passing will be performed based on the piece of environment information when the subject vehicle deviates from the driving lane and there is no preceding vehicle in the adjacent lane.

(33) The battery voltage control device according to (32), in which the case in which there is no preceding vehicle in the adjacent lane includes a case in which the inter-vehicle distance between the preceding vehicle in the adjacent lane and the subject vehicle is equal to or longer than a predetermined value.

(34) The battery voltage control device according to (32),
in which the environment information acquisition module further acquires a piece of environment information that indicates that the inter-vehicle distance between the subject vehicle and a preceding vehicle traveling in the same lane is less than a predetermined value from the result that the image analysis processing module obtains by analyzing the piece of image information, and
in which the driving state forecast module forecasts that the acceleration for passing will be performed based on the piece of environment information when the subject vehicle deviates from the driving lane, there is no vehicle in the adjacent lane, and the inter-vehicle distance between the subject vehicle and the preceding vehicle traveling in the same lane is shorter than the predetermined value.

(35) A battery voltage control method including:
acquiring a piece of environment information of the outside of the vehicle;
forecasting whether or not acceleration for passing will be performed by a lane change based on the piece of environment information of the outside of the vehicle;
computing a voltage margin according to a vehicle speed of a driver-required driving force when the acceleration for passing is forecast; and
controlling step-up of a battery voltage by a step-up converter based on the computed voltage margin.

The invention claimed is:
1. A battery voltage control device, comprising:
a step-up module configured to step-up a voltage of a battery and apply the voltage to a driving motor;
an outside-of-vehicle monitoring module configured to monitor an outside of a vehicle and acquire environment information of the outside of the vehicle; and
a step-up control module configured to control step-up by the step-up module based on the acquired environment information of the outside of the vehicle.

2. The battery voltage control device according to claim 1, further comprising:
a driving state forecast module configured to forecast a driving state including start or stop of the vehicle based on the environment information of the outside of the vehicle,
wherein the step-up control module is further configured to control step-up by the step-up module based on the forecast driving state.

3. The battery voltage control device according to claim 1, wherein the outside-of-vehicle monitoring module comprises an image analysis processing module configured to acquire and analyze image information of the outside of the vehicle obtained through imaging, and acquire the environment information based on the image information.

4. The battery voltage control device according to claim 3, wherein the image analysis processing module is further configured to acquire the image information from a stereo camera assembly.

5. The battery voltage control device according to claim 2, wherein the driving state forecast module is further configured to forecast start or stop of the vehicle based on the environment information that indicates a lighting state of a traffic signal ahead of the vehicle.

6. The battery voltage control device according to claim 2, wherein the driving state forecast module is further configured to forecast start or stop of the vehicle based on the environment information that indicates a lighting state of a brake lamp of a preceding vehicle ahead of the vehicle.

7. The battery voltage control device according to claim 1, further comprising:
a travel mode acquisition module configured to acquire a travel mode that relates to an output characteristic of the driving motor; and
an accelerator opening degree acquisition module configured to acquire an accelerator opening degree, wherein the step-up control module is further configured to control a target step-up voltage of step-up by the step-up module based on the travel mode and the accelerator opening degree.

8. The battery voltage control device according to claim 7, wherein the step-up control module is further configured to set the target step-up voltage to be higher than a necessary step-up voltage necessary for the driving motor to output a target driving force, and change a margin of the target step-up voltage with respect to the necessary step-up voltage according to the travel mode.

9. The battery voltage control device according to claim 7, wherein the step-up control module comprises a future driver-required driving force computation module configured to compute a future driver-required driving force based on the travel mode and the accelerator opening degree, and a target step-up voltage computation module configured to compute the target step-up voltage based on the future driver-required driving force.

10. The battery voltage control device according to claim 9, wherein the future driver-required driving force computation module is further configured to compute a driver-required driving force based on a map on which a relation between the accelerator opening degree and a required driving force is defined for each of the driving modes, and compute the future driver-required driving force based on the driver-required driving force.

11. The battery voltage control device according to claim 10, wherein the future driver-required driving force computation module is configured to perform a limit process, that is based on a threshold of a change rate of the driver-required driving force, on the driver-required driving force, and compute the future driver-required driving force based on the driver-required driving force that has undergone the limit process.

12. The battery voltage control device according to claim 1, further comprising:
a driving state forecast module configured to forecast that an acceleration to pass will be performed by a lane change based on the environment information,
wherein the step-up control module is further configured to control step-up by the step-up module based on a voltage margin according to a vehicle speed or a driver-required driving force based on a determination that the acceleration to pass is forecast to be performed.

13. The battery voltage control device according to claim 12, wherein the step-up control module is further configured to set a value of the voltage margin to be a high value with a decrease in the vehicle speed.

14. The battery voltage control device according to claim 12, wherein the step-up control module is further configured to set a value of the voltage margin to be a high value with a decrease in the required driving force.

15. The battery voltage control device according to claim 12, wherein the step-up control module is further configured to set the voltage margin based on a voltage margin map on which the voltage margin is prescribed according to the vehicle speed or the required driving force.

16. The battery voltage control device according to claim 15, wherein the voltage margin map prescribes the voltage margin based on the vehicle speed or the required driving force according to a driving mode.

17. A battery voltage control method comprising:
acquiring a driving state of a vehicle;
monitoring an outside of the vehicle and acquiring environment information of the outside of the vehicle; and
controlling step-up of a battery voltage by a step-up converter based on the acquired environment information of the outside of the vehicle.

18. The battery voltage control method according to claim 17, further comprising:
forecasting a driving state including starting or stopping of the vehicle based on the environment information of the outside of the vehicle, wherein, in the controlling of the step-up, the step-up of the battery voltage by the step-up converter is controlled based on the forecast driving state.

19. The battery voltage control method according to claim 17, further comprising:
acquiring a travel mode that relates to an output characteristic of a driving motor; and
acquiring an accelerator opening degree,
wherein, in the controlling of the step-up, a target step-up voltage of step-up of a battery voltage to be applied to the driving motor is controlled based on the travel mode and the accelerator opening degree.

20. The battery voltage control method according to claim 17, further comprising:
forecasting that an acceleration for passing will be performed by a lane change based on the environment information of the outside of the vehicle; and
computing a voltage margin according to a vehicle speed of a driver-required driving force based on a determination that the acceleration for passing is forecast, wherein, in the step of controlling the step-up, step-up of a battery voltage by a step-up converter is controlled based on the computed voltage margin.

21. A battery voltage control device, comprising:
a step-up module configured to step-up a voltage of a battery and then apply the voltage to a driving motor;
a step-up control module configured to control step-up by the step-up module based on one of a travel mode or a driving state of a vehicle;
a travel mode acquisition module configured to acquire the travel mode that relates to an output characteristic of the driving motor; and
an accelerator opening degree acquisition module configured to acquire an accelerator opening degree,
wherein the step-up control module is further configured to control a target step-up voltage of step-up by the step-up module based on the travel mode and the accelerator opening degree,
wherein the step-up control module comprises a future driver-required driving force computation module configured to compute a future driver-required driving force based on the travel mode and the accelerator opening degree, and a target step-up voltage computation module configured to compute the target step-up voltage based on the future driver-required driving force, and
wherein the future driver-required driving force computation module is further configured to compute a driver-required driving force based on a map on which a relation between the accelerator opening degree and a required driving force is defined for each of the driving modes, and compute the future driver-required driving force based on the driver-required driving force.

22. A battery voltage control device, comprising:
a step-up module configured to step-up a voltage of a battery and then apply the voltage to a driving motor;
a step-up control module configured to control step-up by the step-up module based on one of a travel mode or a driving state of a vehicle;
an environment information acquisition module configured to acquire environment information of an outside of the vehicle; and
a driving state forecast module configured to forecast that an acceleration to pass will be performed by a lane change based on the environment information,
wherein the step-up control module is further configured to control step-up by the step-up module based on a voltage margin according to a vehicle speed or a driver-required driving force based on a determination that the acceleration to pass is forecast to be performed.

* * * * *